(12) United States Patent
Palanki et al.

(10) Patent No.: US 8,812,023 B2
(45) Date of Patent: Aug. 19, 2014

(54) OUTDOOR POSITION ESTIMATION OF A MOBILE DEVICE WITHIN A VICINITY OF ONE OR MORE INDOOR ENVIRONMENTS

(75) Inventors: Ravi Palanki, San Diego, CA (US); Saumitra Mohan Das, San Jose, CA (US); Hui Chao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 13/572,554

(22) Filed: Aug. 10, 2012

(65) Prior Publication Data

US 2013/0310080 A1    Nov. 21, 2013

Related U.S. Application Data

(60) Provisional application No. 61/649,200, filed on May 18, 2012.

(51) Int. Cl.
*H04W 24/00* (2009.01)
*H04W 64/00* (2009.01)

(52) U.S. Cl.
CPC ............ *H04W 64/00* (2013.01); *H04W 64/003* (2013.01); *H04W 64/006* (2013.01)
USPC ................... 455/456.1; 455/456.2; 455/456.3

(58) Field of Classification Search
CPC ..... H04W 64/00; H04W 64/003; H04W 4/04; H04W 4/216
USPC .......... 455/404.2, 422.1, 414.2, 456.1, 456.2, 455/456.3
See application file for complete search history.

(56) References Cited

U.S. PATENT DOCUMENTS

| 7,245,256 | B2 | 7/2007 | Odamura |
| 7,970,414 | B1 | 6/2011 | Werden et al. |
| 2007/0258421 | A1 | 11/2007 | Alizadeh-Shabdiz et al. |
| 2011/0081919 | A1 | 4/2011 | Das et al. |
| 2011/0172906 | A1 | 7/2011 | Das et al. |
| 2011/0190004 | A1 | 8/2011 | Tenny et al. |
| 2011/0246148 | A1 | 10/2011 | Gupta et al. |
| 2012/0028649 | A1* | 2/2012 | Gupta et al. ............... 455/456.1 |
| 2012/0194383 | A1 | 8/2012 | Kawaguchi et al. |
| 2013/0080048 | A1* | 3/2013 | Kim et al. ...................... 701/431 |
| 2013/0283352 | A1* | 10/2013 | Edge et al. ......................... 726/4 |

FOREIGN PATENT DOCUMENTS

WO    WO-2012038779 A1    3/2012

OTHER PUBLICATIONS

International Search Report and Written Opinion—PCT/US2013/040984—ISA/EPO—Sep. 9, 2013.

* cited by examiner

*Primary Examiner* — Jean Gelin
(74) *Attorney, Agent, or Firm* — Berkeley Law & Technology Group, LLP

(57) ABSTRACT

Various methods, apparatuses and/or articles of manufacture are provided which may be implemented via one or more electronic devices to communicate navigation assistance data for at least one transmitting device that, while operatively provisioned for use in an indoor environment, may prove useful in estimating a position of a mobile device located in an adjacent outdoor environment.

106 Claims, 7 Drawing Sheets

(Overhead view)

(Ground-level view)

OUTDOOR POSITION ESTIMATION OF A MOBILE DEVICE WITHIN A VICINITY OF ONE OR MORE INDOOR ENVIRONMENTS

CLAIM OF PRIORITY UNDER 35 U.S.C. §119

This application claims priority under 35 USC 119 to U.S. Provisional Application Ser. No. 61/649,200, filed May 18, 2012, and entitled, "OUTDOOR POSITION ESTIMATION OF A MOBILE DEVICE WITHIN A VICINITY OF ONE OR MORE INDOOR ENVIRONMENTS", which is assigned to the assignee hereof and which is incorporated herein by reference.

BACKGROUND

1. Field

The subject matter disclosed herein relates to electronic devices, and more particularly to methods, apparatuses and articles of manufacture for use in one or more electronic devices to perform and/or otherwise support certain positioning and/or other like navigation capabilities in a mobile device based, at least in part, on an application of navigation assistance data for at least one transmitting device operatively provisioned for use in an indoor environment to estimate a position of the mobile device in an adjacent outdoor environment.

2. Information

Mobile devices, such as mobile phones, notebook, computers, etc., typically have the ability to estimate location and/or position with a high degree of precision using any one of several technologies such as, for example, satellite positioning systems (e.g., GPS and the like), advanced forward-link trilateration (AFLT), just to name a few examples of signal-based positioning systems and/or corresponding signal-based positioning signals. Using high precision location information, applications for a mobile device may provide a user with various services, such as, for example, vehicle/pedestrian navigation, location-based searching, just to name a couple of examples. Here, high precision signal-based location information (e.g., obtained from GPS and/or other signal-based positioning systems) may be processed according to a global coordinate system (e.g., latitude and longitude or earth-centered xyz coordinates). While such use of signal-based location information referenced to a global coordinate system may be useful in providing some services (e.g., outdoor vehicle navigation), such signal-based location information referenced to a global coordinate system may be impractical for other types of services such as indoor pedestrian navigation.

In certain indoor environments, such as office buildings, shopping malls, airports, stadiums, etc., certain example signal-based positioning techniques may make use of various terrestrial-based wireless signal transmitting devices, e.g., wireless network access points, cellular network base stations, special-purpose beacon transmitters, etc., that transmit wireless signals which may be received by the mobile device and used for positioning purposes. For example, a mobile device may receive a signal-based positioning signal from a transmitter and based thereon determine a pseudorange between the transmitter and receiver. Hence, for example, positioning may be provided based on trilateration and/or other known signal-based positioning techniques.

In some implementations, an indoor navigation system may provide a digital electronic map to mobile devices as they enter a particular indoor area. Such electronic map may show indoor features such as doors, hallways, entry ways, walls, etc., points of interest such as bathrooms, pay phones, room names, stores, etc. Such electronic map may be stored at a server to be accessible by a mobile device through selection of a URL, for example. By obtaining and rendering all or part of an electronic map via a display mechanism, a mobile device may, for example, overlay a current location of the mobile device (and user) over the displayed map to provide the user with additional context.

In certain instances, in addition to an electronic map, an indoor navigation system may selectively provide assistance information to mobile devices to facilitate and/or enable various location based services. Such assistance information may include, for example, information to facilitate measurements of ranges to wireless access points at known fixed locations. In one implementation, For example, "radio heatmap" or "probability heatmap" data indicating and/or otherwise modeling expected RSSI and/or round-trip delay times associated with access points may enable a mobile device to associate signal measurements with locations in an indoor environment. Here, for example, grid points may be laid over locations in an indoor environment at uniform spacing (e.g., 0.5 meter separation of neighboring grid points), or possibly with non-uniform spacing. Thus, radio heatmap and/or other corresponding probability functions/models may be made available from a computing device (such as a server) for each grid point covering an indoor environment.

SUMMARY

In accordance with certain aspects a method may be provided which comprises, at a mobile device: obtaining navigation assistance data for at least a first transmitting device operatively provisioned for use within at least a portion of a first indoor environment and at least a first portion of an outdoor environment that is adjacent to the first indoor environment; and storing at least a portion of the navigation assistance data in a memory on board the mobile device. In accordance with certain example implementations, such a method may further comprise, at the mobile device: with the mobile device in the outdoor environment, acquiring a wireless signal transmitted from the first transmitting device; and estimating a position of the mobile device within the outdoor environment based, at least in part, on application of the navigation assistance data to the wireless signal.

In accordance with certain other aspects, an apparatus may be provided for use in a mobile device. Such an apparatus may comprise means for obtaining navigation assistance data for at least a first transmitting device operatively provisioned for use within at least a portion of a first indoor environment and at least a first portion of an outdoor environment that is adjacent to the first indoor environment; and means for storing at least a portion of the navigation assistance data.

In accordance with yet other aspects, a mobile device may be provided which comprises memory; a communication interface; and a processing unit to: obtain, via the communication interface, navigation assistance data for at least a first transmitting device operatively provisioned for use within at least a portion of a first indoor environment and at least a first portion of an outdoor environment that is adjacent to the first indoor environment; and initiate storage of at least a portion of the navigation assistance data in the memory.

In accordance with still other aspects, an article of manufacture may be provided which comprises a non-transitory computer readable medium having stored therein computer implementable instructions that are executable by a processing unit of a mobile device to: obtain navigation assistance data for at least a first transmitting device operatively provisioned for use within at least a portion of a first indoor environment and at least a first portion of an outdoor environment that is adjacent to the first indoor environment; and initiate storage of at least a portion of the navigation assistance data at the mobile device.

In accordance with certain further aspects, a method may be provided comprises, at a computing device: receiving a request for navigation assistance data from a mobile device, the request for navigation assistance data being indicative of at least one of: an initial estimated position of the mobile device within an outdoor environment; or a location context identifier (LCI) for at least a portion of a first indoor environment that is adjacent to the outdoor environment; and transmitting a response to the mobile device, the in response comprising navigation assistance data for at least a first transmitting device that is operatively provisioned for use within at least a first portion of the outdoor environment and at least the portion of the first indoor environment.

Accordance with certain other aspects, an apparatus may be provided which comprises: means for receiving a request for navigation assistance data from a mobile device, the request for navigation assistance data being indicative of at least one of: an initial estimated position of the mobile device within an outdoor environment; or a location context identifier (LCI) for at least a portion of a first indoor environment that is adjacent to the outdoor environment; and means for transmitting a response to the mobile device, the in response comprising navigation assistance data for at least a first transmitting device that is operatively provisioned for use within at least a first portion of the outdoor environment and at least the portion of the first indoor environment.

In accordance with yet still other aspects, a computing device may be provided which comprises: a communication interface; and a processing unit to: obtain a request for navigation assistance data from a mobile device via the communication interface, the request for navigation assistance data being indicative of at least one of: an initial estimated position of the mobile device within an outdoor environment; or a location context identifier (LCI) for at least a portion of a first indoor environment that is adjacent to the outdoor environment; and initiate transmission of a response to the mobile device via the communication interface, the in response comprising navigation assistance data for at least a first transmitting device that is operatively provisioned for use within at least a first portion of the outdoor environment and at least the portion of the first indoor environment.

In accordance with certain other aspects, an article of manufacture may be provided which comprises a non-transitory computer readable medium having stored therein computer implementable instructions that are executable by a processing unit of a computing device to: obtain a request for navigation assistance data from a mobile device, the request for navigation assistance data being indicative of at least one of: an initial estimated position of the mobile device within an outdoor environment; or a location context identifier (LCI) for at least a portion of a first indoor environment that is adjacent to the outdoor environment; and initiate transmission of a response to the mobile device, the in response comprising navigation assistance data for at least a first transmitting device that is operatively provisioned for use within at least a first portion of the outdoor environment and at least the portion of the first indoor environment.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
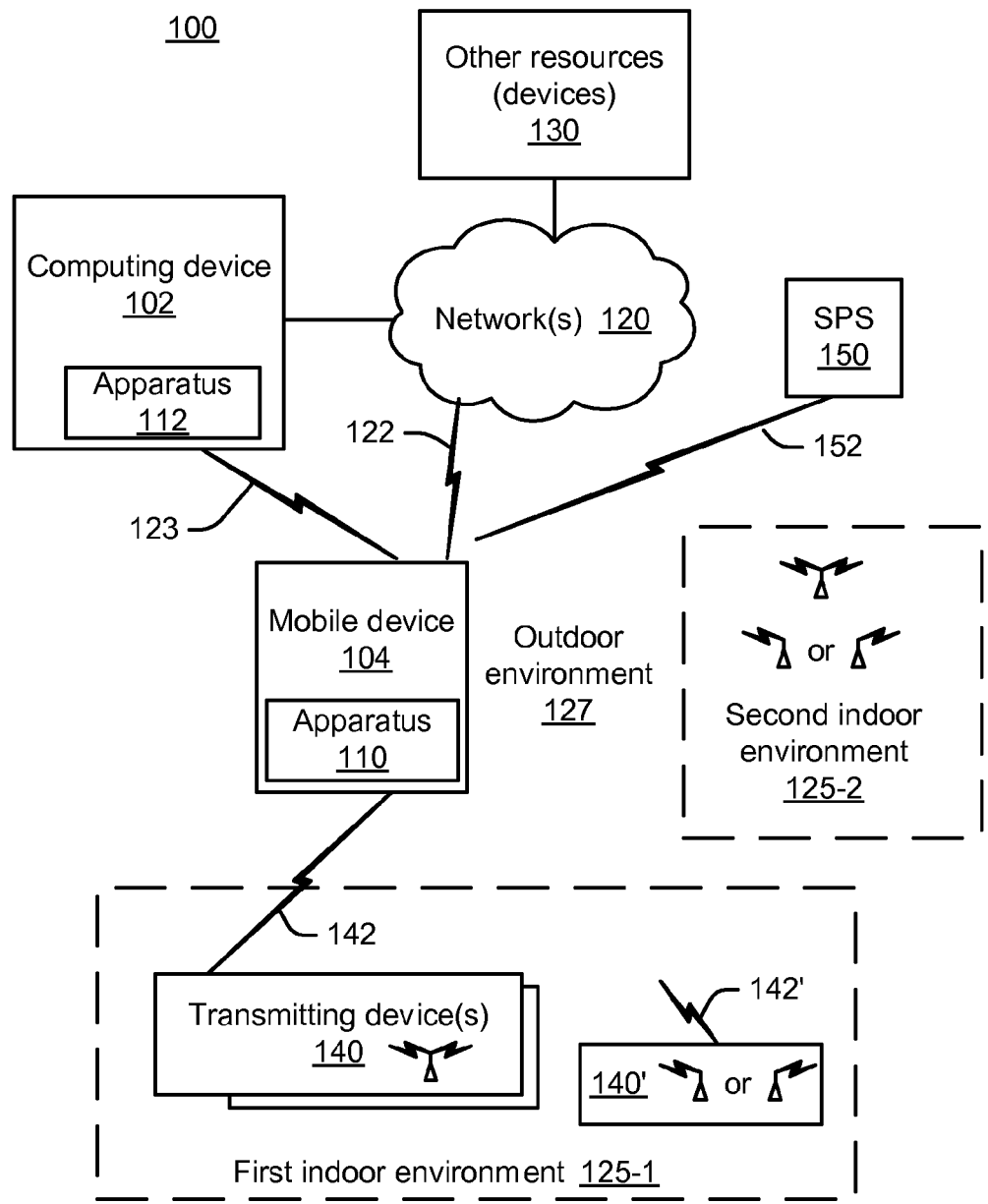
FIG. 1 is a schematic block diagram illustrating an example environment that includes representative electronic devices that may perform and/or otherwise support certain positioning and/or other like navigation capabilities in a mobile device based, at least in part, on an application of navigation assistance data for at least one transmitting device operatively provisioned for use in an indoor environment to estimate a position of the mobile device in an adjacent outdoor environment, in accordance with an example implementation.

An electronic device, such as, a mobile device, may, at times, be unable to acquire a requisite number of wireless positioning signals and/or acquire wireless positioning signals of adequate quality/accuracy from GPS satellites, cellular towers, etc., to determine a position of the mobile device and/or track movements of the mobile device within certain outdoor environments, such as an "urban canyon" within a city. For example, in certain outdoor environments there may be an inadequate number of visible transmitting devices, such as, GPS satellites, cell towers, etc., and/or their arrangement may result in inadequate positioning accuracy when used for positioning in certain settings. In certain outdoor environments, while there may be an adequate number of transmitting devices, the condition of all or some of the wireless positioning signals that reach the mobile device may limit their use for positioning purposes. For example, some wireless positioning signals may follow multiple paths (multipath) from the transmitter to the receiver which may render such signals less useful for positioning purposes.

In certain implementations, an indoor navigation system may provide indoor navigation assistance data to a mobile device upon entry into a particular indoor environment, e.g., such as a structure, etc. Such indoor navigation assistance data may include, for example, information to facilitate measurements of ranges to transmitting devices positioned at known fixed locations. Also, in certain instances a "radio heatmap" and/or other like information may be provided and which may, for example, indicate expected RSSI, round-trip delay times, and/or the like or some combination thereof for a transmitting device and which may enable a mobile station to associate observed signal characteristics with specific positions, etc., in an indoor environment. Such indoor navigation assistance data may also include locations of radio frequency (RF) beacon transmitters for use obtaining position estimates through trilateration (e.g., by computing ranges to RF beacon transmitters from RSSI and round-trip delay), and/or through the use of other like positioning techniques.

In certain instances, a mobile device moving into an area (such as an indoor pedestrian navigation environment) may contact a server or other like computing device to obtain navigation assistance data for use in navigating within the pedestrian navigation environment such as, for example, locations and identities of beacon transmitters and/or associated heatmap data for use in obtaining an indoor position fix, just to name a few examples. Such navigation assistance data may, for example, represent metadata associated with one or more electronic maps of the indoor environment. In an example implementation, a mobile device may transmit a request for navigation assistance data from a server using a location context identifier (LCI), e.g., as a handle for the request. Such an LCI may be associated with a locally defined area such as, for example, a particular floor of a building or other indoor area which may or may not be mapped according to a global coordinate system. Thus, in certain example implementations, position estimates in areas covered by an LCI may be referenced according to a local coordinate system. In certain example implementations, an LCI may be referenced to a global coordinate system.

In particular outdoor environments such as an "urban canyon" environment, positioning techniques that rely on acquisition of signals from a SPS or cellular base stations may not be feasible or particularly effective, e.g., due to signal attenuation, multipath, etc. As described in greater detail herein, in accordance with certain aspects, a mobile device in certain portions of an outdoor environment may obtain a position fix, at least in part, from an application of navigation assistance data to signals acquired from transmitting devices operatively provisioned for use in one or more indoor environments adjacent to the outdoor environment. For example, as described in greater detail, in certain instances a useful coverage area for one or more transmitting devices positioned at a periphery of a structure defining an indoor environment may extend (intentionally or unintentionally) into at least a portion of an adjacent outdoor environment. Accordingly, in certain instances, wireless signals from such transmitting devices may be acquired by a mobile device located in the outdoor environment and within an appropriate vicinity of the indoor environment.

With this in mind, various techniques are provided herein for providing applicable navigation assistance data for use by mobile device located in an outdoor environment within appropriate vicinity of one or more indoor environments. Such navigation assistance data may, for example, include identities and locations of certain transmitting devices providing significant outdoor coverage, which may allow a mobile device to quickly attempt to acquire signals from those transmitting devices. While in the outdoor area, a mobile device may, for example, consider certain characteristics of signals (e.g., signal strengths, propagation times, etc.) acquired from such transmitting devices with the navigation assistance data, at least in part, to estimates the position of the mobile device.

In accordance with certain example implementations, a mobile device may obtain navigation assistance data for one or more transmitting devices that may be operatively provisioned for use within certain portions of one or more indoor environments and, for various reasons, may also provide a usable coverage area that extends into at least a portion of an outdoor environment that is adjacent to the indoor environment(s). For example, navigation assistance data may be obtained for a transmitting device (e.g., a wireless access point, etc.) that may be arranged at or near periphery of a structure forming an indoor environment. Here, for example, in certain implementations antenna selection/placement and/or tuning may permit a portion of a usable coverage area to also cover portion of adjacent outdoor environment.

As described in greater detail below, navigation assistance data for such a transmitting device may, for example, identify the transmitting device (e.g., using a unique identifier, a Mac address, a service set identifier (SSID), a location context identifier (LCI) or the like reference, etc.), indicate a position of the transmitting device (e.g., map coordinates, latitude/longitude, an altitude, an LCI or other like reference, etc.), and/or possibly provide additional information about one or more wireless signals and/or characteristics of such wireless signals as may be transmitted under certain conditions from the transmitting device and acquired by a mobile device operating in at least a portion an adjacent outdoor environment. Thus, for example, navigation assistance data may be indicative of one or more wireless signal types, expected transmission and/or reception signal strengths, etc., and which may be of use by one or more positioning functions within a mobile device to determine its position within the outdoor environment and/or otherwise with respect to one or more transmitting devices and/or one or more indoor environments. In certain example implementations, navigation assistance data may comprise a radio heatmap for at least one transmitting device. For example, in certain instances a radio heatmap may comprise data and/or functions/instructions indicative of a correlation between one or more wireless signal characteristics (e.g., signal strength, a round trip time, etc.) that may be measured or otherwise obtained by the receiving mobile device, and estimated ranges between the respective antennas of the transmitting device and receiving mobile device.

Accordingly, with the mobile device in the outdoor environment, at least one wireless signal transmitted from at least one transmitting device may be acquired, and a position of the mobile device within the outdoor environment may be estimated based, at least in part, on an application of the navigation assistance data to the wireless signal. Thus, for example, a range between the respective antennas of the transmitting device and receiving mobile device may be estimated based, at least in part, on a radio heatmap and/or other like information that may be provided to and/or otherwise indicated in the navigation assistance data.

In accordance with certain aspects, navigation assistance data may be specifically tailored for use by mobile devices having positioning and/or navigation capabilities suitable for use in an outdoor environment that is adjacent to one or more indoor environments. Thus for example, in certain implementations, navigation assistance data may be specifically tailored and/or otherwise affected so as to not comprise navigation assistance data for one or more transmitting devices that may be operatively provisioned for use within an indoor environment but not much, if any, of an adjacent outdoor environment. For example, navigation assistance data may comprise useful information about one or more transmitting devices located at a periphery and/or otherwise operatively arranged such that a portion of its useful coverage area extends into at least a portion of an outdoor environment. However, in certain examples, navigation assistance data for one or more transmitting devices that may be located significantly within a structure defining an indoor environment and/or otherwise operatively arranged such that little if any of its useful coverage area extends outside of the indoor environment. Hence, in certain example implementations, navigation assistance data may be tailored to include only a subset of transmitting devices that may be operatively provisioned for use within an indoor environment, e.g., those that provide for possible outdoor environments use as well. Moreover, in certain example implementations, it may be beneficial for a navigation assistance data to correspond to a further reduced subset of transmitting devices, e.g., those that may provide a usable coverage area that includes and/or is near to an initial estimated position of the mobile device within an adjacent outdoor environment. Here, for example, if an initial estimated position of the mobile device within an adjacent outdoor environment places the mobile device closer to an east facing side of a structure (e.g., a building, etc.), then it may be beneficial for such a mobile device to obtain navigation assistance data that may be specifically tailored and/or otherwise reduced in size to include useful information for one or more transmitting devices that may be located near to the east facing side of the structure and which have a useful coverage area that may extend outward from the east facing side of the structure.

It should be kept in mind, however, that in certain implementations if a mobile device is able to acquire a plurality of wireless signals, the mobile device may selectively choose a subset of the acquired wireless signals for use in positioning (e.g., based on signal strength, quality, transmitting device, electronic map, etc.).

In certain example implementations, a mobile device may obtain navigation assistance data from one or more other electronic devices (e.g., computing devices) by transmitting a first message indicative of an initial estimated position of the mobile device within the outdoor environment, and subsequently receiving one or more other messages comprising all or part of the navigation assistance data. Hence, for example, such navigation assistance data may be selected based on the initial estimated position of the mobile device within the outdoor environment. In certain example implementations, an initial estimated position of the mobile device within the outdoor environment may be based, at least in part, on one or more previous position fixes, one or more other acquired and/or previously acquired wireless positioning signals, one or more inertial and/or environmental sensor inputs, one or more user inputs, and/or the like or some combination thereof. Thus for example, a last known position fix from an SPS and/or a terrestrial-based positioning system may be used as an initial rough estimated position of the mobile device within the outdoor environment.

In certain example implementations, a mobile device may obtain navigation assistance data from one or more other electronic devices by transmitting at least a first message indicative of an initial estimated position of the mobile device within the outdoor environment, and subsequently receiving at least a second message that may be indicative of a location context identifier (LCI) (or a plurality of LCIs, and/or the like) for at least a portion of the one or more adjacent and/or otherwise likely nearby indoor environments. Here, for example, an LCI may be associated with a particular structure and/or portion thereof, and/or some other aspect relating to the indoor environment, such as, for example, a preface, use, occupant, service, etc., it may be associated with all or part of the indoor environment. Thus for example, one or more LCIs may be associated with a hospital, a shopping mall, an airport, and/or some portion thereof, and/or some other aspect thereof.

A mobile device, having obtained one or more LCIs may, for example, transmit at least a third message to one or more electronic devices to request navigation assistance data that may be determined based, at least in part, on at least one LCI indicated in the third message(s). A mobile device may for example, subsequently receive at least a fourth message comprising all or part of the requested and/or otherwise applicable navigation assistance data. As used herein, the term "message" is intended to cover one or more messages. Thus, in certain instances, a "fourth message" may comprise a plurality of messages. Moreover, in certain instances, two or more of such a plurality of messages may be received from different computing devices. For example, in certain implementations, all or part of the navigation assistance data corresponding to different LCIs (e.g., different indoor environments, etc.) may be received from different computing devices.

As illustrated by certain examples herein, in certain implementations such second message(s) and fourth message(s) may be transmitted from the same computing device(s) or from different computing devices. For example, in certain instances a second message may be transmitted by a server or other like device having access to particular LCI information, etc., but which may or may not have access to the requested and/or otherwise applicable navigation assistance data. Hence, in certain instances a fourth message may be transmitted by a server and/or other like device having access to the requested and/or otherwise applicable navigation assistance data for one or more LCIs identified in one or more third messages.

Similarly, as illustrated by certain examples herein, in certain implementations such first message(s) and third message(s) may be transmitted to the same computing device(s) or to different computing devices. For example, in certain instances a first message may be transmitted to a server or other like device having access to particular LCI information, etc., but which may or may not have access to requested and/or otherwise applicable navigation assistance data. Hence, in certain instances a third message may be transmitted to a server and/or other like device having access to the requested and/or otherwise applicable navigation assistance data for one or more LCIs identified in the third message(s).

In certain example implementations, navigation assistance data may indicate an altitude corresponding to at least an LCI, and/or at least one transmitting device operatively provisioned for use within the LCI and/or applicable indoor environment. For example, in certain implementations, it may be beneficial to take into consideration an altitude of a transmitting device in estimating a relative and/or other like position of a mobile device. Here, for example, it may be beneficial to estimated position of the mobile device by also estimating an altitude and/or other like height measurement for the mobile device. For example, a mobile device may be located on a second floor of a parking garage and/or elevated walkway between structures and hence may be closer to transmitting device(s) located at similar altitudes or elevations in one or more adjacent buildings, etc., in comparison to other transmitting device(s) located near a ground-floor/level and/or one or more higher floors/levels. In certain example implementations, a plurality of transmitting devices may be used to estimate a position of the mobile device in three dimensions.

In accordance with certain other aspects, one or more electronic devices (e.g., computing devices) may be provided to support a mobile device as described herein. For example, one or more computing devices may be provided to receive one or more requests for navigation assistance data from a mobile device, wherein the one or more requests for navigation assistance data may be indicative of an initial estimated position of the mobile device within an outdoor environment, and/or a LCI and/or other like information for at least a portion of a first indoor environment that is adjacent to the outdoor environment. The one or more computing devices may, for example, transmit one or more responses to the mobile device, the one or more responses may comprise all or part of applicable navigation assistance data for one or more transmitting devices that may be operatively provisioned for use within at least a first portion of the outdoor environment and at least the portion of the first indoor environment.

With this introduction mind, attention is drawn first to FIG. 1, which is a schematic block diagram illustrating an example environment 100 that includes representative electronic devices that may perform and/or otherwise support certain positioning and/or other like navigation capabilities in a mobile device 104 based, at least in part, on an application of navigation assistance data for at least one transmitting device 140 operatively provisioned for use in a first indoor environment 125-1 to estimate a position of mobile device 104 in an adjacent outdoor environment 127.

In this example, the representative electronic devices include mobile device 104, computing device 102, other resources (devices) 130, and network(s) 120. In this example all of the representative electronic devices are illustrated as being located outside of first indoor environment 125-1. In other example implementations, with the exception of mobile device 104 which is intended to be located in outdoor environment 127, all or part of one or more of the representative electronic devices may be located with first indoor environment 125-1, one or more other indoor environments as represented here by a second indoor environment 125-2, and/or outdoor environment 127. As described in greater detail herein, in certain example implementations all or part of first indoor environment 125-1 and/or second indoor environment 125-2 may be associated with one or more electronic maps, LCIs, etc.

As illustrated, various terrestrial-based transmitting devices 140 and 140' (e.g., wireless network access points, etc.) may be operatively provisioned for use by mobile devices navigating within first indoor environment 125-1. Other like terrestrial-based transmitting devices may be provided in a second indoor environment 125-2. While illustrated in FIG. 1 as being physically located within first indoor environment 125-1, it should be kept in mind that in certain implementations all or part of one or more transmitting devices 140/140' may be physically attached to or otherwise arranged nearby a structure defining at least a part of first indoor environment 125-1. In this example, a transmitting device 140 may represent a transmitting device that is operatively provisioned for use by a mobile device within at least a portion of first indoor environment 125-1 and at least a portion of adjacent outdoor environment 127. Thus, for example, the useful coverage area for a transmitting device 140 may cover at least a portion of first indoor environment 125-1 and an adequate portion of adjacent outdoor environment 127. To the contrary, a transmitting device 140' in this example may represent a transmitting device that is operatively provisioned for use by a mobile device within at least a portion of first indoor environment 125-1 but not likely for use by a mobile device located in outdoor environment 127. Thus, for example, the useful coverage area for a transmitting device 140' may cover at least a portion of first indoor environment 125-1 but none or less than an adequate portion of adjacent outdoor environment 127. It should be recognized that what amounts to an adequate portion of an outdoor environment may vary depending on the wireless capabilities of the transmitting device and/or mobile devices, the size and/or arrangement of the indoor and outdoor environments, etc. For example, if two buildings are separated by three meters and there is a contiguous walking path between the buildings, then a transmitting device having a useful coverage area that extends one or more meters into the walking path may be considered a transmitting device 140 while a transmitting device having a useful coverage area that extends less than one meter into the walking path may be considered a transmitting device 140'. In another example, if a closest walkway is separated from a building by a vineyard that is ten meters in width, then a transmitting device having a useful coverage area that extends ten meters or more may be considered a transmitting device 140 while a transmitting device having a useful coverage area that extends less than ten meters may be considered a transmitting device 140'. Of course these are just a few examples and claimed subject matter is not intended to be so limited.

Further still, as illustrated, one or more satellite positioning system systems (SPS) 150 may be provided to transmit one or more wireless positioning signals in the form of one or more SPS signals 152 that may, at times, be acquired by mobile device 104 and used for positioning and/or navigation purposes. Additional description of such devices as provided herein although the technology is well known.

As shown, computing device 102 comprises an apparatus 112 that may support certain positioning and/or other like navigation capabilities in mobile device 104 based, at least in part, on an application of navigation assistance data for at least one transmitting device 140. For example, in certain implementations, apparatus 112 may receive one or more messages requesting navigation assistance data for at least one transmitting device 140 and/or at least one LCI, and in response transmit one or more messages comprising all or part of the requested and/or otherwise applicable navigation assistance data. In other examples, in certain implementations, apparatus 112 may receive one or more messages requesting information about LCIs that may be within a vicinity of an initial estimated position of a mobile device (e.g., a current rough position of the mobile device, a particular position that a mobile device may possibly be at or nearby in the future, etc.), and in response transmit one or more messages indicative of one or more LCIs within the vicinity of an initial estimated position of a mobile device.

For example, in certain implementations, apparatus 112 may obtain certain navigation assistance data from one or more other computing devices, etc. Hence, in certain instances, apparatus 112 may function as an intermediary exchange, server, and/or other like repository of navigation assistance data. In certain instances, apparatus 112 may, for example, provide further processing of certain information within and/or otherwise relating to one or more navigation assistance data and/or other measurements that may be obtained from mobile device 104. Thus, for example, in certain implementations, apparatus 112 may support one or more positioning and/or navigation functions of the mobile devices.

In certain example implementations, computing device 102 and/or other resources 130 may provide additional data and/or instructions that may be of use to mobile device 104, apparatus 110, apparatus 112, as may be beneficial to positioning and/or navigation functions of mobile device 104.

Apparatus 112 may represent one or more computing platforms that may communicate with one or more other resources (devices) 130, either directly and/or indirectly, e.g. via one or more network(s) 120. Apparatus 112 may communicate with mobile device 104, either directly (e.g., via wireless communication link 123) and/or indirectly (e.g., as illustrated using network(s) 120 and wireless communication link 122). Again, while computing device 102 happens to be illustrated in this example as being located outside of first indoor environment 125-1 and second indoor environment 125-2, it should be recognized that in certain other implementations, all or part of computing device 102 and/or apparatus 112 may be located within first indoor environment 125-1 and/or second indoor environment 125-2. While first indoor environment 125-1 and second indoor environment 125-2 are illustrated as not overlapping, in certain other implementations all or part of such first or second indoor environments, and/or still other indoor environments may overlap.

Network(s) 120 may comprise one or more communication systems and/or data networks having various interconnected devices supporting communication between computing device 102 and one or more other resources (devices) 130. As mentioned, network(s) 120 may further support communication between computing device 102 and mobile device 104. For example, communication between computing device 102 and mobile device 104 may allow for certain data and/or instructions to be exchanged there between.

As used herein a "mobile device" may represent any electronic device that may be moved about either directly or indirectly by a user in at least outdoor environment 127 and which may communicate with one or more other devices via one or more wired and/or wireless communication links. Some examples include a cell phone, a smart phone, a computer (e.g., a personal computer such as a laptop computer, tablet computer, a wearable computer, etc.), a navigation aid, a tracking device, a digital book reader, a gaming device, music and/or video player device, a camera, a machine, a robot, etc.

Other resources (devices) 130 may represent one or more computing platforms from which computing device 102 and/or mobile device 104 may obtain certain data files and/or instructions, and/or to which computing device 102 and/or mobile device 104 may provide certain data files and/or instructions. For example, in certain instances, all or part of an electronic map for at least outdoor environment 127, all or part of navigation assistance data for one or more transmitting devices, and/or the like may be obtained by computing device 102 and/or mobile device 104 from one or more other resources (devices) 130. For example, in certain instances, all or part of a set of instructions for use in apparatus 112 and/or apparatus 110 may be obtained from other resources (devices) 130.

As mentioned, SPS 150 which may transmit one or more SPS signals 152 to mobile device 104. SPS 150 may, for example, represent one or more global navigation satellite system (GNSS), one or more regional navigation satellite systems, and/or the like or some combination thereof. Additionally, one or more terrestrial-based indoor positioning systems may be provided as represented by example transmitting device(s) 140/140' capable of transmitting one or more wireless signals 142/142' all or some of which may be used for signal-based positioning within first indoor environment 125-1 and possibly in outdoor environment 127. Thus for example, transmitting device(s) 140/140' may represent a wireless access point, a repeater, a dedicated beacon transmitting device, just to name a few examples, which have known positions. SPS signals 152 and/or wireless signals 142 may, at times, be acquired by mobile device 104 and used to estimate its position within outdoor environment 127. Wireless signals 142/142' may, at times, be acquired by mobile device 104 and used to estimate its position within first indoor environment 125-1.

In certain implementations, a mobile device 104 may receive or acquire SPS signals 152 from SPS satellites (not shown). In some embodiments, SPS satellites may be from one GNSS, such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, WAAS, EGNOS, QZSS, just to name a few examples.

In certain implementations, mobile device 104 may transmit radio signals to, and receive radio signals from, a wireless communication network (e.g., represented by network(s) 120). In one example, mobile device may communicate with a cellular communication network (e.g., represented by network(s) 120) by transmitting/receiving wireless signals to/from a base station transceiver or the like. Similarly, mobile device 104 may receive wireless signals 142/142' from one or more transmitting devices 140/140'. In certain instances, mobile device 104 may also transmit wireless signals to one or more transmitting devices 140/140'.

In a particular example implementation, mobile device 104 and/or computing device 102 may communicate with each other and/or other resources (devices) 130 over network(s) 120. As mentioned, network(s) 120 may comprise any combination of wired or wireless links. In a particular implementation, network(s) 120 may comprise an Internet Protocol (IP) infrastructure and/or the like, which may be capable of facilitating communication between mobile device 104, computing device 102 and/or other resources (devices) 130. In another example implementation, network(s) 120 may comprise cellular communication network infrastructure such as, for example, a base station controller or master switching center to facilitate mobile cellular communication with mobile device 104.

In particular implementations, and as discussed below, mobile device 104 may have circuitry and processing resources capable of computing a position fix of mobile device 104. For example, mobile device 104 may compute a position fix based, at least in part, on pseudorange measurements to one or more SPS satellites. Here, mobile device 104 may compute such pseudorange measurements based, at least in part, on of pseudonoise code phase detections in signals 152 acquired from one or more SPS satellites. In particular implementations, mobile device 104 may receive SPS navigation assistance data that may aid in the acquisition of SPS signals 152 transmitted by SPS 150 including, for example, almanac, ephemeris data, Doppler search windows, just to name a few examples. In certain implementations, a position fix obtained based, at least in part, on SPS signals 152 and/or other like wireless signals may be used as an initial estimated position (e.g., a rough position estimate) of mobile device 104 within outdoor environment 127 at the subsequent point in time.

In other implementations, mobile device 104 may obtain an initial estimated position by processing signals received from one or more cellular network transmitting devices and/or the like having known positions (e.g., such as base station transceiver, etc.) using any one of several techniques such as, for example, advanced forward trilateration (AFLT), observed time difference of arrival (OTDOA), etc. In certain example implementations, a range from mobile device 104 may be measured to a plurality of such cellular network transmitting devices, e.g., based, at least in part, on pilot signals transmitted by the cellular network transmitting devices from their known locations and received at mobile device 104. In certain instances, computing device 102, network(s) 120, and/or other resources (devices) 130 may be capable of providing certain forms of cellular network navigation assistance data to mobile device 104, which may include, for example, locations and identities of base transceiver stations, etc., to facilitate certain positioning techniques that might use cellular network signals. For example, a base station almanac (BSA) which indicates locations and identities of cellular base stations in a particular region or regions.

In particular environments, such as first indoor environment 125-1, mobile device 104 may not be capable of acquiring signals from a sufficient number of SPS satellites and/or of a sufficient quality, and/or from a sufficient number of cellular network transmitting devices and/or more of a sufficient quality, to effectively perform the requisite processing to efficiently compute an updated an estimated position in outdoor environment 127. However, as presented by the various examples herein, mobile device 104 may be capable of computing a position fix based, at least in part, on one or more wireless signals 142 acquired from transmitting devices 140 (e.g., WLAN access points positioned at known locations, repeaters, extenders, etc.). For example, mobile device 104 may obtain a position fix by measuring ranges to one or more wireless access points which are positioned at known locations for use in an first indoor environment 125-1, and which have useful coverage areas that extend into portions of an adjacent outdoor environment 127. Such ranges may be measured, for example, by obtaining a MAC ID address from signals received from such access points and obtaining range measurements to the access points by measuring one or more characteristics of one or more signals received from such access points such as, for example, received signal strength (RSSI) or round trip time (RTT). In certain example implementations, mobile device 104 may obtain an estimated position by applying characteristics of acquired signals to a radio heatmap, probability heatmap, and/or the like or some combination thereof indicating expected RSSI and/or RTT signatures at particular locations in the outdoor environment 127.

Figure 2:
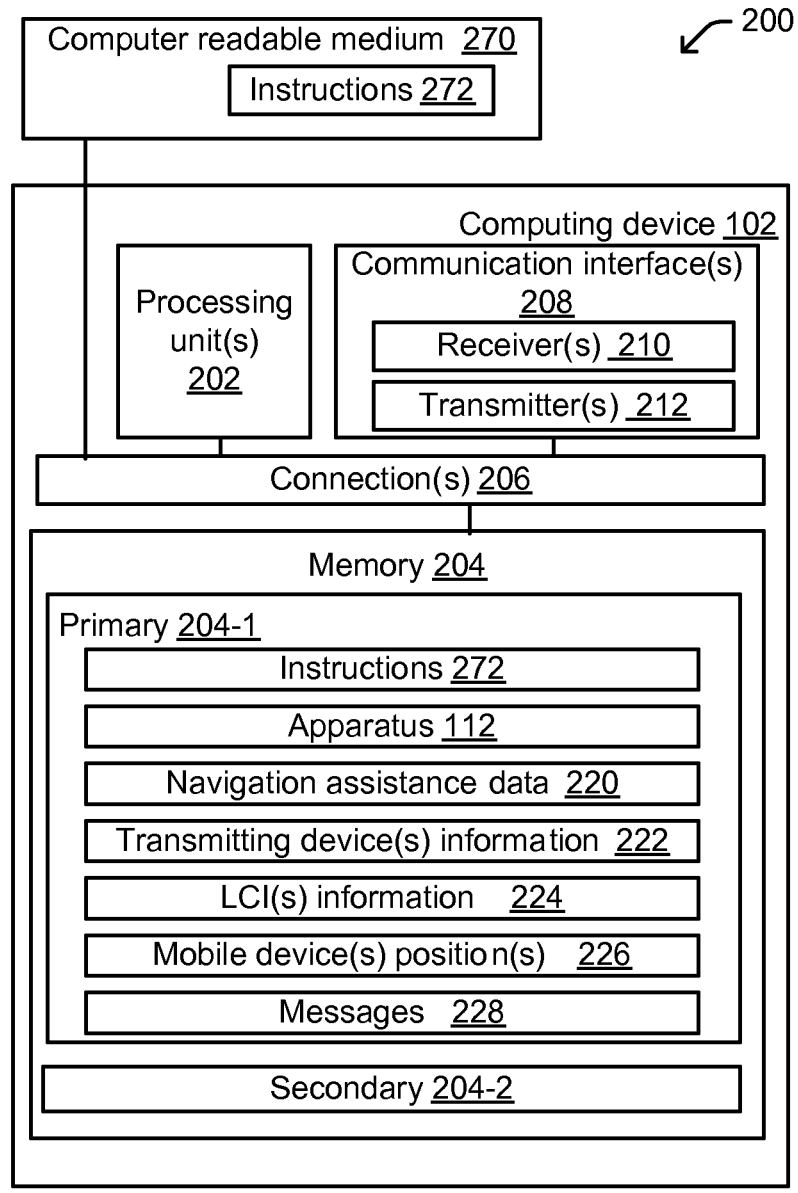
FIG. 2 is a schematic block diagram illustrating certain features of a computing platform that may be provided in an electronic device, such as a computing device, to support certain positioning and/or other like navigation capabilities in a mobile device based, at least in part, on an application of navigation assistance data for at least one transmitting device operatively provisioned for use in an indoor environment to estimate a position of the mobile device in an adjacent outdoor environment, in accordance with an example implementation.

Attention is drawn next to FIG. 2, which is a schematic block diagram illustrating certain features of a computing platform 200 that may be provided in an electronic device, such as a computing device 102, to support certain positioning and/or other like navigation capabilities in a mobile device 104 based, at least in part, on an application of navigation assistance data for at least one transmitting device operatively provisioned for use in an first indoor environment 125-1 to estimate a position of mobile device 104 in an adjacent outdoor environment 127, in accordance with an example implementation.

As illustrated computing platform 200 may comprise one or more processing units 202 to perform data processing (e.g., in accordance with the techniques provided herein, as part of apparatus 112, etc.) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within computing platform 200. Secondary memory 204-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 270. Memory 204 and/or non-transitory computer readable medium 270 may comprise instructions 272 for use in performing data processing, e.g., in accordance with the techniques and/or example apparatus 112 (FIG. 1), and/or all or part of example process 500 (FIG. 5) as provided herein.

Computing platform 200 may, for example, further comprise one or more communication interface(s) 208. Communication interface(s) 208 may, for example, provide connectivity to network(s) 120, mobile device 104, and/or other resources (devices) 130 (FIG. 1), e.g., via one or more wired and/or wireless communication links. As illustrated here communication interface(s) 208 may comprise one or more receiver(s) 210, one or more transmitter(s) 212, and/or the like or some combination thereof. Communication interface(s) 208 may implement one or more communication protocols as may be required to support one or more wired and/or wireless communication links.

Processing unit(s) 202 and/or instructions 272 may, for example, provide or otherwise make use of one or more signals that may be stored in memory 204 from time to time and which may represent data and/or instructions, such as: instructions 272; apparatus 112; navigation assistance data 220 (e.g., for one or more transmitting devices); transmitting device information 222 (e.g., for one or more transmitting devices); LCI information 224 (e.g., identifying a position of one or more LCIs within one or more indoor environments, identifying one or more LCI as with regard to an adjacent outdoor environment, identifying one or more transmitting devices operatively provisioned for use in an LCI, etc.); one or more mobile device positions 226 (e.g., an initial estimated position, a subsequent estimated position, etc.); one or more messages 228 (e.g., received from one or more mobile devices, to transmit or previously transmitted to one or more mobile devices, etc.); and/or the like or some combination thereof. It should be kept in line, that in certain example implementations, some types of data may comprise or otherwise be represented at least in part by one or more functions and/or other like computer implementable instructions, e.g., which may be used to calculate certain data values, etc.

Figure 3:
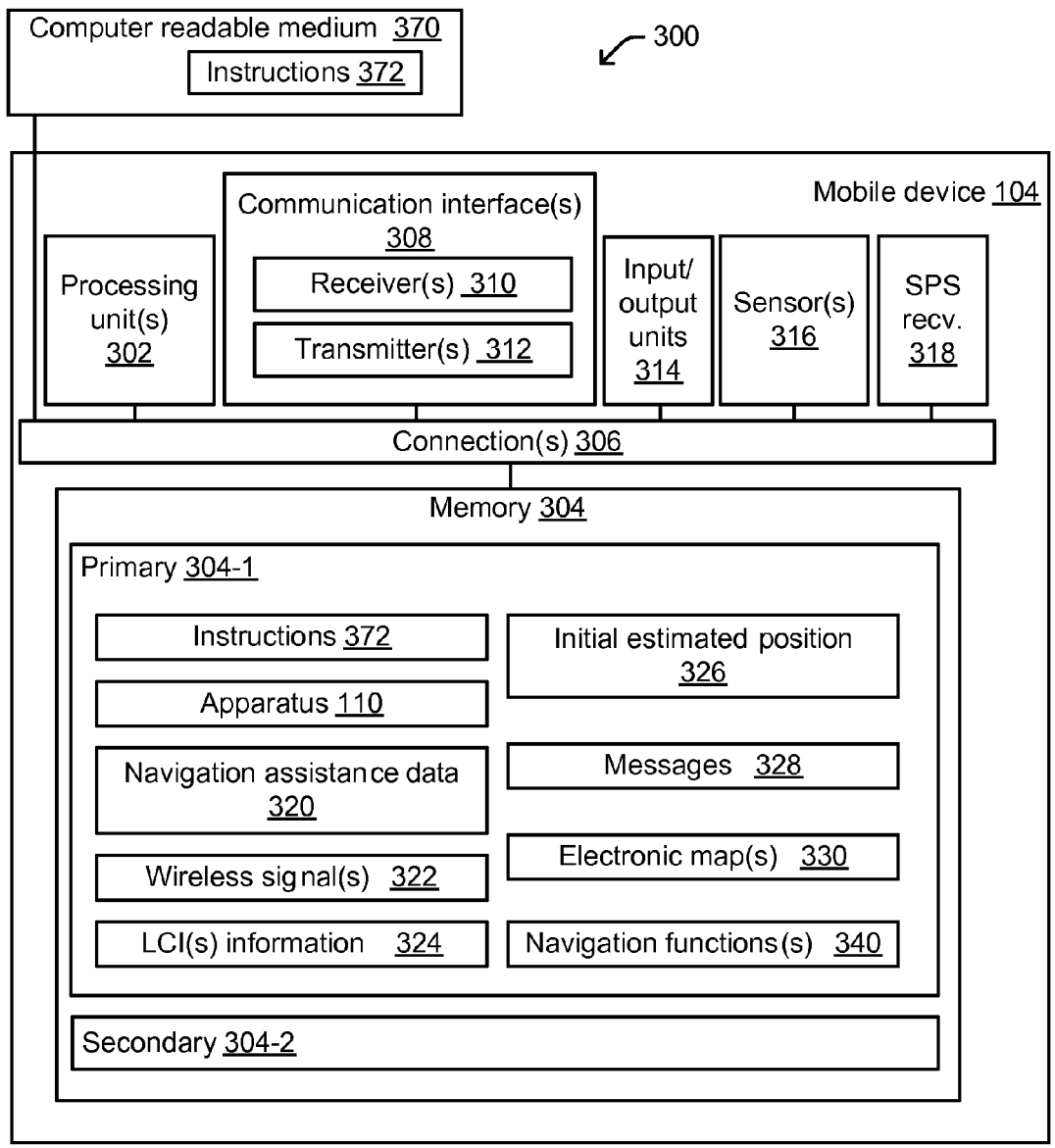
FIG. 3 is a schematic block diagram illustrating certain features of a computing platform that may be provided in an electronic device, such as a mobile device, to perform certain positioning and/or other like navigation capabilities in a mobile device based, at least in part, on an application of navigation assistance data for at least one transmitting device operatively provisioned for use in an indoor environment to estimate a position of the mobile device in an adjacent outdoor environment, in accordance with an example implementation.

Attention is drawn next to FIG. 3, which is a schematic block diagram illustrating certain features of a computing platform 300 that may be provided in an electronic device, such as a mobile device 104, to perform certain positioning and/or other like navigation based, at least in part, on an application of navigation assistance data 320 for at least one transmitting device operatively provisioned for use in an indoor environment to estimate a position of the mobile device in an adjacent outdoor environment.

As illustrated computing platform 300 may comprise one or more processing units 302 to perform data processing (e.g., in accordance with the techniques provided herein, and/or apparatus 110, etc.) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, FLASH memory, SIM cards, etc. While illustrated in this example as being separate from the processing units, it should be understood that all or part of a primary memory may be provided within or otherwise co-located/coupled with processing unit(s) 302, or other like circuitry within mobile device 104. Secondary memory 304-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 370. Memory 304 and/or non-transitory computer readable medium 370 may comprise instructions 372 for use in performing data processing, e.g., in accordance with the techniques and/or example apparatus 110 (FIG. 1) and/or all or part of one or more example process 400 (FIG. 4), as provided herein.

Computing platform 300 may, for example, further comprise one or more communication interface(s) 308. Communication interface(s) 308 may, for example, comprise one or more radios, represented here by one or more receivers 310, and/or one or more transmitters 312. It should be understood that in certain implementations, one or more radios 313 may comprise one or more receivers, one or more transmitters, and/or one or more transceivers, and/or the like. Further, it should be understood that although not shown, one or more radios 313 may comprise one or more antennas and/or other circuitry as may be applicable given the radios function/capability.

By way of further example, communication interface(s) 308 may, for example, provide connectivity to network(s) 120, computing device 102, and/or other resources (devices) 130 (FIG. 1), e.g., via one or more wired and/or wireless communication links. As illustrated here communication interface(s) 308 may comprise one or more receivers 310, one or more transmitters 312, and/or the like or some combination thereof. Communication interface(s) 308 may implement one or more communication protocols as may be required to support one or more wired and/or wireless communication links. Communication interface(s) 308 may, in certain example instances, further comprise one or more receivers capable of receiving wireless signals 142 from one or more transmitting devices 140. Further, in certain example instances, mobile device 104 may comprise an SPS receiver 318 capable of receiving and processing SPS signals 152 in support of one or more signal-based positioning capabilities.

In accordance with certain example implementations, communication interface(s) 208, communication interface(s) 308, and/or other resources in network(s) 120 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 208 and/or communication interface(s) 308 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN. In another aspect, a wireless transmitting device may comprise a femtocell, utilized to extend cellular telephone service into a business or home. In such an implementation, one or more mobile devices may communicate with a femtocell via a CDMA cellular communication protocol, for example, and the femtocell may provide the mobile device access to a larger cellular telecommunication network by way of another broadband network such as the Internet.

Mobile device 104 may, for example, further comprise one or more input/output units 314. Input/output units 314 may represent one or more devices or other like mechanisms that may be used to obtain inputs from and/or provide outputs to one or more other devices and/or a user of mobile device 104. Thus, for example, input/output units 314 may comprise various buttons, switches, a touch pad, a trackball, a joystick, a touch screen, a microphone, a camera, and/or the like, which may be used to receive one or more user inputs. In certain instances, input/output units 314 may comprise various devices that may be used in producing a visual output, an audible output, and/or a tactile output for a user. For example, input/output units 314 may be used to present a solicitation to the user and to obtain certain corresponding user inputs.

Mobile device 104 may, for example, comprise one or more sensors 316. For example, sensor(s) 316 may represent one or more inertial sensors, one or more environmental sensors, etc., which may be useful in detecting aspects of the environment 100 and/or mobile device 104. Thus for example, sensor(s) 316 may comprise one or more accelerometers, one or one or more gyroscopes or gyrometers, one or more magnetometers and/or the like, one or more barometers, one or more thermometers, etc. Further, in certain instances sensor(s) 316 may comprise one or more input devices such as a microphone, a camera, a light sensor, etc. In certain instances, one or more signals generated by one or more sensors 316 may also be considered in estimating a position of mobile device 104, e.g., using various known techniques such as dead reckoning, etc.

Processing unit(s) 302 and/or instructions 372 may, for example, provide or otherwise make use of one or more signals that may be stored in memory 304 from time to time and which may represent data and/or instructions, such as: instructions 372; apparatus 110; navigation assistance data 320 (e.g., for one or more transmitting devices 140); one or more wireless signals 322 (e.g., acquired from one or more transmitting devices 140); LCI information 324 (e.g., identifying locations and/or other aspects associated with one or more LCIs associated with one or more indoor environments and/or one or more outdoor environments, identifying one or more transmitting devices 140 operatively provisioned for use within an LCI); an initial estimated position 326; one or more messages 328 (e.g., obtained from one or more other electronic devices, and/or to be transmitted or previously transmitted to one or more other electronic devices); one or more electronic maps 330 (e.g., for one or more indoor environments and/or one or more outdoor environments); one or more navigation and/or positioning functions 340; and/or the like or some combination thereof. It should be kept in line, that in certain example implementations, some types of data may comprise or otherwise be represented at least in part by one or more functions and/or other like computer implementable instructions, e.g., which may be used to calculate certain data values, etc. Additionally, while some the example data and/or instructions as illustrated in FIG. 3 share the same names as example data and/or instructions as illustrated in FIG. 2, it should be kept in mind that in certain instances all or part of such example data and/or instructions may be distinctly different.

SPS receiver 318 may be capable of receiving and acquiring SPS signals 152 via one or more antennas (not shown). SPS receiver 318 may also process, in whole or in part, acquired SPS signals 152 for estimating a position or location of mobile device 104. In certain instances, SPS receiver 318 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 104. In certain implementations, all or part of such processing of acquired SPS signals may be performed by other processing capabilities in mobile device 104, e.g., processing unit(s) 302, memory 304, etc., in conjunction with SPS receiver 318. Storage of SPS or other signals for use in performing positioning operations may be performed in memory 304 or registers (not shown).

Sensors 316 may generate analog or digital signals that may be stored in memory 304 and processed by DPS(s) (not shown) or processing unit(s) 302 in support of one or more applications such as, for example, applications directed to positioning or navigation operations.

Processing unit(s) 302 may comprise a dedicated modem processor or the like that may be capable of performing baseband processing of signals received and downconverted at receiver(s) 310 of communication interface(s) 308 or SPS receiver 318. Similarly, a modem processor or the like may perform baseband processing of signals to be upconverted for transmission by wireless transmitter(s) 312. In alternative implementations, instead of having a dedicated modem processor, baseband processing may be performed by a general purpose processor or DSP (e.g., general purpose/application processor). It should be understood, however, that these are merely examples of structures that may perform baseband processing, and that claimed subject matter is not limited in this respect.

Figure 4:
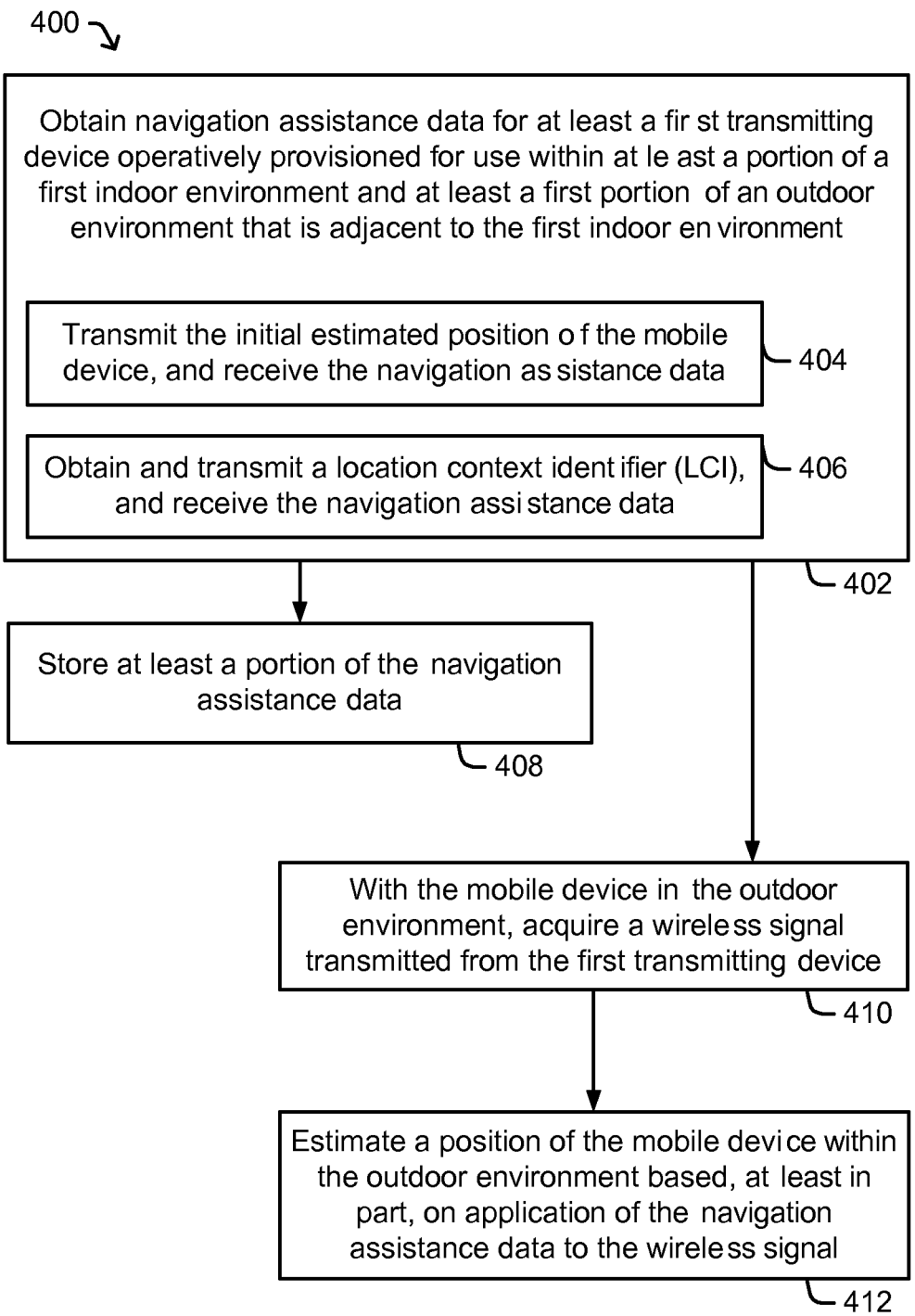
FIG. 4 is a flow diagram illustrating an example process that may be implemented in whole or in part in an electronic device, such as a mobile device, to perform certain positioning and/or other like navigation capabilities in a mobile device based, at least in part, on an application of navigation assistance data for at least one transmitting device operatively provisioned for use in an indoor environment to estimate a position of the mobile device in an adjacent outdoor environment, in accordance with an example implementation.

Attention is drawn next to FIG. 4, which is a flow diagram illustrating an example process 400 that may be implemented in whole or in part in an electronic device, such as mobile device 104, to perform certain positioning and/or other like navigation capabilities based, at least in part, on an application of navigation assistance data for at least one transmitting device operatively provisioned for use in an indoor environment to estimate a position of the mobile device in an adjacent outdoor environment.

At example block 402, navigation assistance data for at least a first transmitting device may be obtained. Here, for example, the first transmitting device may be operatively provisioned for use in at least a portion of a first indoor environment and at least a first portion of an outdoor environment that is adjacent to the first indoor environment. For example, FIG. 1 illustrates transmitting devices 140 operatively provisioned for use in at least a portion of a first indoor environment 125-1 and which have useful coverage areas that extend into certain portions of an outdoor environment 127.

As part of example block 402, an initial estimated position of the mobile device may be obtained. For example, in certain implementations an initial estimated position of the mobile device may be obtained from and/or otherwise based, at least in part, on one or more previous position fixes. An initial estimated position of the mobile device may represent a rough position estimate with regard to an outdoor environment. As illustrated by way of several previous examples described herein, various known techniques may be applied in whole or in part by the mobile device to obtain such an initial estimated position.

In certain instances, for example at block 404, a mobile device may transmit its initial estimated position to one or more other electronic devices, and in response receive all or part of the requested and/or otherwise applicable navigation assistance data. For example, as illustrated in FIG. 1, a computing device 102 may be provided with an apparatus 112 to receive an initial estimated position of the mobile device, determine applicable navigation assistance data (e.g. in accordance with the techniques provided herein), and transmit requested and/or otherwise applicable navigation assistance data via one or more messages to mobile device 104.

In certain instances, for example at block 406, a mobile device may obtain information about one or more applicable LCIs and transmit one or more messages to one or more other electronic devices requesting navigation assistance data applicable for such one or more LCIs. Mobile device 104 may then receive requested and/or otherwise applicable navigation assistance data from one or more other electronic devices. For example, as illustrated in FIG. 1, a computing device 102 and/or other resources (devices) 130 may receive an initial estimated position of the mobile device, determine one or more applicable LCIs (e.g. in accordance with the techniques provided herein), and transmit one or more messages identifying the one or more applicable LCI as to mobile device 104. Further, for example, computing device 102 may be provided with an apparatus 112 to receive information from the mobile device identifying one or more LCIs, determine applicable navigation assistance data (e.g. in accordance with the techniques provided herein) for the one or more LCI as, and transmit requested and/or otherwise applicable navigation assistance data via one or more messages to mobile device 104.

At example block 408, at least a portion of the navigation assistance data may be stored that mobile device 104. For example, all or part of the navigation assistance data may be stored in a primary and/or secondary memory of a mobile device 104. Accordingly, mobile device 104 may, in certain instances comprise navigation assistance data obtained at various points in time.

At example block 410, with the mobile device in the outdoor environment, the mobile device may acquire one or more wireless signals transmitted from at least the first transmitting device. Here, for example, with reference to FIG. 1 a transmitting device 140 may transmit a wireless signal 142 within a useful range that extends at least part of the way into first indoor environment 125-1 and at least part of the way into outdoor environment 127. Hence, with the mobile device located in certain portions of outdoor environment 127, the mobile device may acquire one or more wireless signals 142.

At example block 412, a position of the mobile device within the outdoor environment may be estimated based, at least in part, on an application of the navigation assistance data obtained at block 404 to the applicable wireless signal(s) acquired at block 410. As illustrated by way of several previous examples described herein, various known techniques may be applied in whole or in part by the mobile device to obtain such an estimated position. For example, certain positioning techniques may be implemented which use trilateration and/or the like to estimate a position of the mobile device based, at least in part, on a plurality of wireless signals acquired from a plurality of transmitting devices. For example, certain positioning techniques may be implemented which use weighted combinations of the locations of nearby transmitting devices. For example, certain positioning techniques may be implemented which makes use of one or more acquired wireless signals along with one or more previous position estimates, one or more SPS signals, one or more inertial and/or environmental sensor measurements, one or more user inputs, and/or the like or some combination thereof. Of course it should be understood that, as with all of the other examples herein, claimed subject matter is not intended to be so limited. It should be clear that the various techniques are suitable for use with a wide variety of positioning techniques based at least in part on one or more wireless signals.

Figure 5:
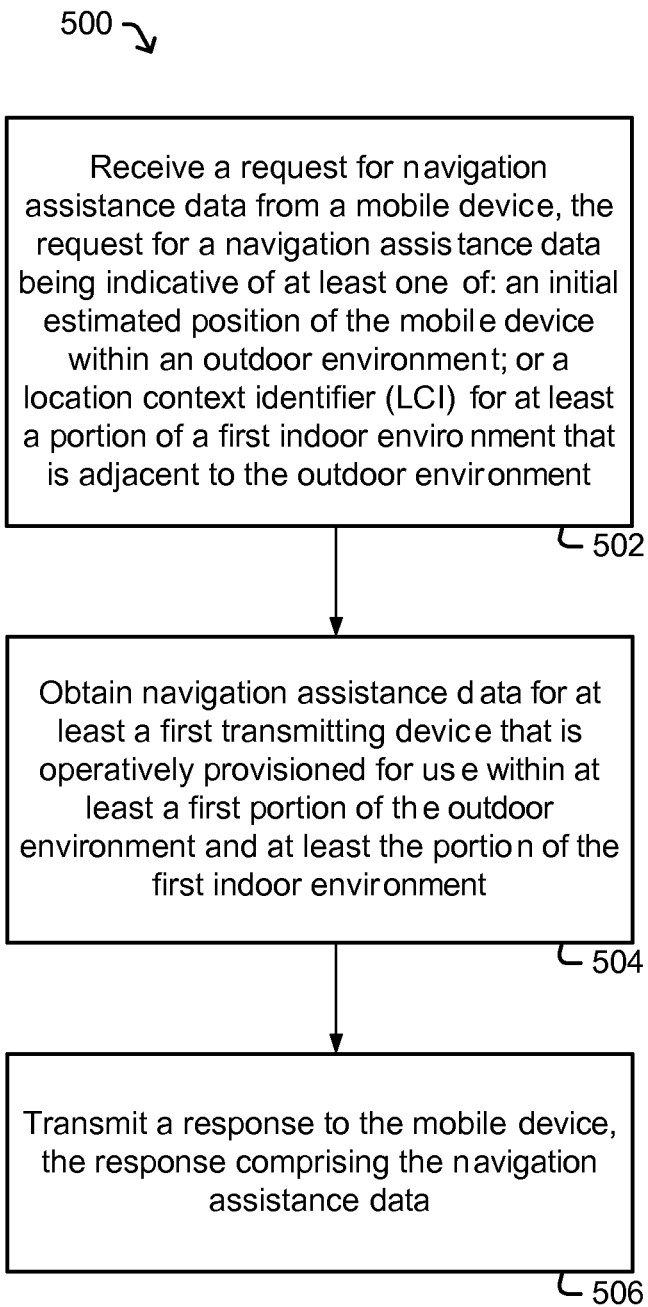
FIG. 5 is a flow diagram illustrating an example process that may be implemented in whole or in part in an electronic device, such as a computing device, to support certain positioning and/or other like navigation capabilities in a mobile device based, at least in part, on an application of navigation assistance data for at least one transmitting device operatively provisioned for use in an indoor environment to estimate a position of the mobile device in an adjacent outdoor environment, in accordance with an example implementation.

Attention is drawn next to FIG. 5, which is a flow diagram illustrating an example process 500 that may be implemented in whole or in part in an electronic device, such as a computing device 102, to support certain positioning and/or other like navigation capabilities in a mobile device based, at least in part, on an application of navigation assistance data for at least one transmitting device operatively provisioned for use in an indoor environment to estimate a position of the mobile device in an adjacent outdoor environment, in accordance with an example implementation.

At example block 502, one or more requests for navigation assistance data may be received (e.g., directly, indirectly) by a computing device from a mobile device. Here, for example, a request for navigation assistance data may be indicative of an initial estimated position of the mobile device within an outdoor environment. Here, for example, a request for navigation assistance data may be indicative of one or more LCIs for at least a portion of a first indoor environment that is adjacent to the outdoor environment.

At example block 504, computing device may obtain navigation assistance data for at least a first transmitting device that is operatively provisioned for use within at least a first portion of the outdoor environment and at least a portion of the first indoor environment. Here, for example, a computing device may consider an initial estimated position of the mobile device within the outdoor environment to identify applicable navigation assistance data for one or more transmitting devices that may be within an adequate vicinity of the mobile device, and which are operatively provisioned for use not only within a nearby indoor environment but also at least a portion of the adjacent outdoor environment. Here, for example, a computing device may consider information identifying one or more LCIs to identify applicable navigation assistance data for one or more transmitting devices that may or operatively provisioned for use not only within the indoor environment of the LCI but also at least a portion of the adjacent outdoor environment. In certain further example implementations, as previously described, a computing device and/or another electronic device may identify one or more LCIs based on an initial estimated position of the mobile device.

At example block 506, a computing device may transmit (e.g., directly or indirectly) a response in the form of one or more messages to the mobile device comprising the requested and/or otherwise applicable navigation assistance data, e.g., as identified at block 504. It should be understood that, in certain implementations, all or part of such a response may be transmitted to the mobile device from one or more computing devices. Thus, for example, in certain implementations, a particular server may provide all or part the navigation assistance data to one or more other computing devices and/or to the mobile device. In certain implementations, one or more computing devices may be operatively provisioned for one or more specific LCIs, etc. In certain implementations, one or more computing devices may be operatively provisioned to provide certain types of data, e.g., electronic maps, radio heatmaps, routability graphs, location-based services, etc. Accordingly, in certain implementations one or more computing devices may act to aggregate all or part of the navigation assistance data, and forward such to one or more other computing devices or the mobile device as applicable.

Figure 6A:
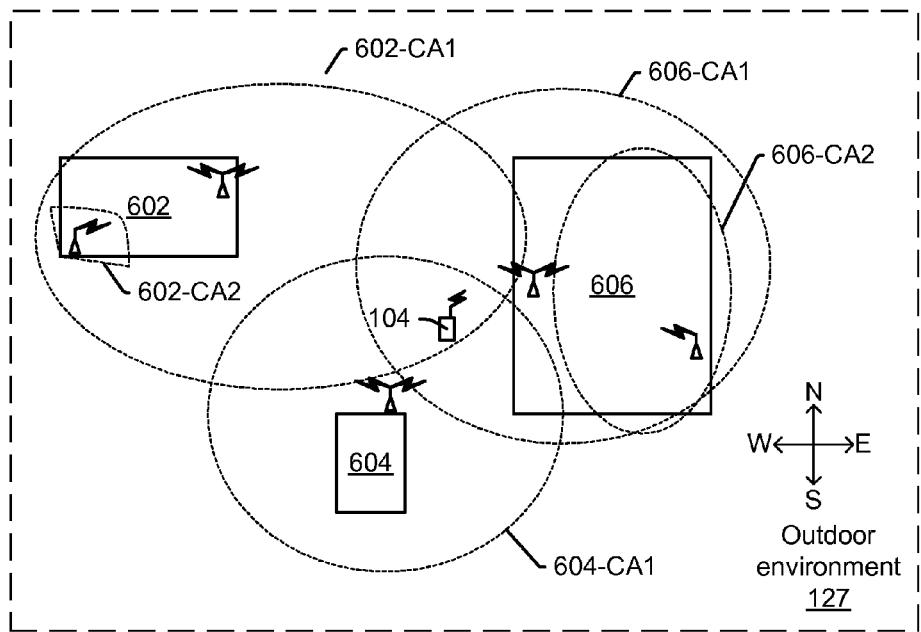
FIG. 6A is an illustrative diagram showing, from an overhead view, an outdoor environment surrounding a plurality of indoor environments defined by structures having example transmitting devices operatively provisioned for use therein, in accordance with an example implementation.

Attention is drawn next to FIG. 6A, which is an illustrative diagram showing, from an overhead view, an outdoor environment 127 that is adjacent to and surrounds a plurality of indoor environments defined by structures 602, 604 and 606, each of which is illustrated as having example transmitting devices operatively provisioned for use therein, in accordance with an example implementation. For example, structure 602 which may represent a multi-level building is illustrated as having at least two transmitting devices. The first transmitting device associated with structure 602 is drawn with two lightning bolt symbols to represent that it is a transmitting device 140 (see FIG. 1) that is operatively provisioned for use within at least a portion of an indoor environment and at least a portion of an adjacent outdoor environment. Here for example, usable coverage area 602-CA1 is illustrated for this particular transmitting device, and which clearly includes most of the indoor environments associated with structure 602 as well as a portion of outdoor environment 127. A second transmitting device associated with structure 602 is drawn using a single lightning bolt symbol to represent that it is a transmitting device 140' (see FIG. 1) that is operatively provisioned for use within at least a portion of an indoor environment but which is not likely of use in an adjacent outdoor environment. Here for example usable coverage area 602-CA2 is illustrated for this particular transmitting device, and which clearly indicates that most of the usable coverage area is located within an internal environment of structure 602.

Similarly, a transmitting device is illustrated as being associated with structure 604, and having two lightning bolt symbols to represent that it is a transmitting device 140 (see FIG. 1) that is operatively provisioned for use within at least a portion of an indoor environment associated with structure 604 as well as at least a portion of adjacent outdoor environment 127. Here, for example, usable coverage area for the transmitting device associated with structure 604 is illustrated as coverage area 604-CA1, which includes the entire indoor environment provided by structure 604, as well as a portion of outdoor environment 127.

As previously mentioned, all or part of one or more transmitting devices may be arranged at various locations within and/or without a particular indoor environment and/or structure defining the indoor environment. Thus, in this example, the transmitting device associated with structure 604 is illustrated as being mounted to and/or otherwise external of at least a portion of structure 604.

From this illustrated view, structure 606 has two transmitting devices associated with it, similar to structure 602. Here, the transmitting device illustrated with two lightning bolt symbols has a corresponding usable coverage area 606-CA1, which includes most of the indoor environment defined by structure 606 from this viewpoint as well as a portion of outdoor environment 127. Hence, with respect to FIG. 1, this first transmitting device associated with structure 606 may represent a transmitting device 140. Here, the second transmitting device illustrated with a single lightning bolt symbol has a corresponding usable coverage area 606-CA2, which includes some of the indoor environment defined by structure 606 from this viewpoint but very little of outdoor environment 127. Hence, with respect to FIG. 1, this second transmitting device associated with structure 606 may represent a transmitting device 140'.

As illustrated, a mobile device 104 may be located in the position within outdoor environment wherein one or more wireless signals 142 from one or more transmitting devices 140 (e.g., with respect to FIG. 1) may be acquired and possibly used along with applicable navigation assistance data to estimate a current position of the mobile device. As illustrated in FIG. 6A, mobile device 104 appears to be within usable coverage areas 602-CA1, 604-CA1 and 606-CA1.

Further as illustrated in this overhead view, it may be seen that at times an initial estimated position of the mobile device may be used to determine particular navigation assistance data based on where the mobile device may be relative to one or more boundaries of the indoor environment. For example, as illustrated in FIG. 6A, mobile device 104 is located in a vicinity closer to a west facing side of structure 606, east and south facing sides of structure 602, and north and east facing sides of structure 604. Hence, in certain implementations, one or more LCIs and/or transmitting devices 140 may be identified along with applicable navigation assistance data based on such relative directional aspects. Further, in certain instances it may be beneficial to also consider the relative distance is between an initial estimated position of mobile device 104 and one or more transmitting devices and/or LCIs within the vicinity of the mobile device. Here for example, mobile device 104 is illustrated as being much closer to structure 604 and 606, then structure 602. Thus, for example, in certain implementations selection of navigation assistance data and/or otherwise identifying LCIs and/or transmitting devices that may be of particular use to a mobile device within outdoor environment 127 may be arranged and/or otherwise prioritized in some manner based on such relative estimated distances and/or directions, and/or possibly other information associated with one or more of the transmitting devices and/or receiving devices. By selectively ordering or otherwise affecting a search for acquiring wireless signals, it may be possible to make more efficient use of the mobile device and/or speed of an estimated position fix.

Figure 6B:
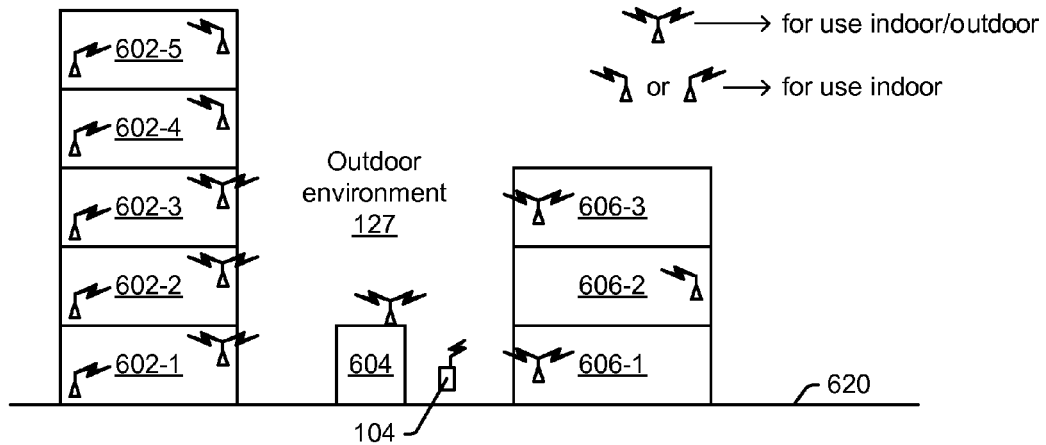
FIG. 6B is an illustrative diagram showing, from a ground-level view, the outdoor environment and plurality of indoor environments defined by structures, as in FIG. 6A, and having example transmitting devices operatively provisioned on various floors/levels therein, in accordance with an example implementation.

Attention is drawn next to FIG. 6B, which is similar to FIG. 6A, but illustrates a ground-level view of structures 602, 604 and 606, within outdoor environment 127. Here, as illustrated structure 602 extends upward from a ground-level 620 with five levels, labeled 602-1, 602-2, 602-3, 602-4 and, 602-5. The example transmitting devices are shown in each of the levels using applicable symbols as previously defined.

Thus, for example, level 602-1 which may relate to a particular LCI, comprises a first level of structure 602 and includes at least a first transmitting device (represented here by transmitting device 140) and a second transmitting device (represented here by transmitting device 140'). As such, the first transmitting device 140 of level 602-1 may provide a usable coverage area similar to 602-CA1 of FIG. 6A, and the second transmitting device 140' of level 602-1 may provide a useful coverage area similar to 602-CA to FIG. 6A. Similar arrangements are also provided in level 602-2 and level 602-3. Hence, a mobile device 104 may be able to acquire one or more wireless signals from one or more transmitting devices 140 on levels 602-1, 602-2, and/or 602-3 at certain positions within the outdoor environment 127. As previously mentioned, in certain implementations a navigation assistance data may also include altitude or other like elevation or hide information for a transmitting device 140, which as illustrated here may be beneficial in determining a corresponding altitude of mobile device 104. For example, it may be beneficial to know if a mobile device 104 is positioned closer to a ground-level and/or possibly a pedestrian bridge (not shown) between higher-level floors of two structures.

As can be seen by the example in FIG. 6B, certain higher levels, such as levels 602-4 and 602-5 may not include a transmitting device 140 that may be used in the outdoor environment 127, e.g., due to their expected likely away from the ground-level. Instead, as shown, level 602-4 and 602-5 include transmitting devices 140'.

As further shown in FIG. 6B, structure 604 in this example represents a single level structure having a transmitting device 140, again arranged at least in part on an external portion and/or the like outside of the structure 604. Here, for example, the transmitting device 140 of structure 604 may have a usable coverage area 604-CA1 as in FIG. 6A and which may extend also in a vertical direction down a ground-level 620 and possibly to a level higher than structure 604. Those skilled in the art will understand various antenna designs and/or other techniques may be provided to affect usable coverage area for a given transmitting device.

Structure 606 is illustrated in this example as having three levels, labeled 606-1, 606-2, and 606-3. Here, as illustrated by the transmitting device symbols, the first level 606-1 and the third level 606-3 have transmitting devices 140, while level 606-2 has a transmitting device 140'. Here, for example, the transmitting devices at first level 606-1 and third level 606-3 may have usable coverage areas similar to 606-CA1 of FIG. 6A, e.g., extended to fill the 3-D space about the environment 127 as applicable. Transmitting device at a second level 606-2 may, for example, have a usable coverage area similar to 606-CA2 of FIG. 6A. In accordance with certain example implementations, a mobile device may seek to use wireless signals obtained from certain transmitting devices in order to provide improved position estimation. For example, it maybe useful to use wireless signals obtained from transmitting devices on different levels of the structure to obtain a particular two-dimensional and/or three-dimensional position estimation, satisfy certain dilution of precision (DOP) criteria, etc.

Figure 7:
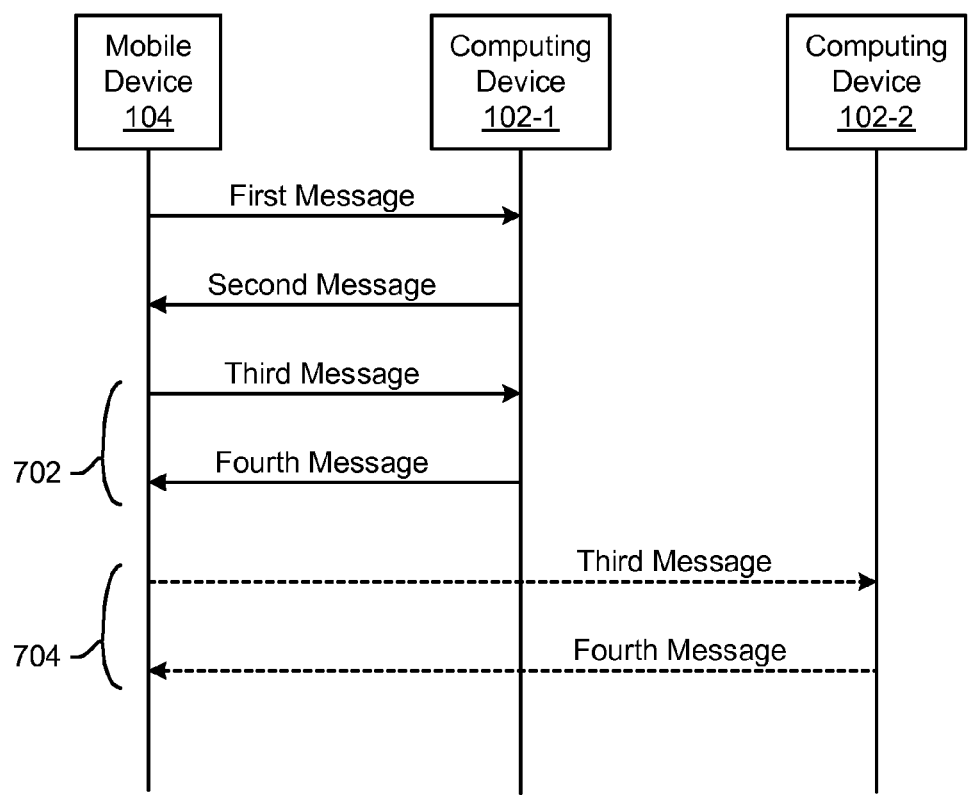
FIG. 7 is a vertically-oriented timeline showing example message exchanges between a mobile device and one or more computing devices, in accordance with certain example implementations.

Reference is made next to FIG. 7, which is a timeline message exchange diagram illustrating certain examples by which a mobile device may obtain navigation assistance data for a transmitting device that is operatively provisioned for use within at least a portion of a indoor environment and at least a portion of an outdoor environment that is adjacent to the indoor environment in accordance with certain limitations.

FIG. 7 shows an example message exchange between a mobile device 104 the first computing device 102-1 that includes a first message (e.g., which as with the other messages shown in FIG. 7 may represent one or more actual messages) transmitted from mobile device 104 to first computing device 102-1, and a second message transmitted in response from computing device 102-1 to mobile device 104. The first message may, for example, be indicative of an initial estimated position of mobile device 104 in an outdoor environment. As previously mentioned, initial estimated position may, for example, identify an estimated current position, a last previously known position, and/or some other particular position that the mobile device may at sometime in the future be located at or nearby. The second message may, for example, be indicative of or otherwise comprise one or more LCIs, and/or the like for at least a portion of an indoor environment that is adjacent to the outdoor environment and nearby the estimated position of mobile device. In certain example implementations, a second message may identify one or more other computing devices from which all or part of the applicable navigation assistance data may be requested/obtained. For example, as indicated in accordance with an exchange 704 below, a second message may identify one or more other computing devices represented by a second computing device 102-2 from which navigation assistance data may be requested/obtained.

In accordance with certain example implementations, an exchange 702 may follow the second message wherein a third message may be transmitted from mobile device 104 to first computing device 102-1, and a fourth message may be transmitted in response from first computing device 102-1 to mobile device 104. Here, for example, the third message may define a request for navigation assistance data indicative of one or more of the LCIs and/or the like, e.g. as specified in the second message. The fourth message may, for example, comprise all or part of the requested navigation assistance data for all or part of one or more of the LCIs and/or the like, e.g. as may be identified in the third message.

In accordance with certain other example implementations, an exchange 704 may follow the second message instead of and/or in addition to exchange 702, which includes one or more other computing devices, represented here by a second computing device 102-2. Here, for example, in exchange 704 a third message is transmitted from mobile device 104 to second computing device 102-2, and a fourth message is transmitted in response from second computing device 102-1 to mobile device 104. In this example, the third message may define a request for navigation assistance data indicative of one or more of the LCIs and/or the like, e.g. as specified in the second message. The fourth message may, for example, comprise all or part of the requested navigation assistance data for all or part of one or more of the LCIs and/or the like, e.g. as may be identified in the third message. Thus, as illustrated by example exchange 704, in certain implementations the second and fourth message may be transmitted by different computing devices, and/or the first and third messages may be transmitted to different computing devices.

Thus, for example as illustrated in the various examples herein, a mobile device that is located within an outdoor environments adjacent to one or more indoor environments may obtain a navigation assistance data associated with particular transmitting devices that are operatively provisioned for use within at least a part of one or more indoor environments as well as certain portions of an adjacent outdoor environment. In certain implementations, such transmitting devices may be specifically intended and hence operatively arranged to have usable coverage areas that extend outward into an adjacent outdoor environment. In certain other implementations, such transmitting devices may not have been specifically intended to provide a usable coverage area that extends outward into an adjacent outdoor environment, but which have an inherent design (e.g., a sufficiently wide, and/or omnidirectional antenna pattern, beam-forming capability, variable transmit power capability, etc.) which nonetheless presents a usable coverage area that extends outward into an adjacent outdoor environment.

In certain example implementations, a mobile device may determine that it may be located within an outdoor environment and attempt to acquire one or more SPS signal(s). If, however, the mobile device determines that the acquired SPS signal(s) are insufficient for use in a position fix (e.g., not enough SPS signals were acquired, an error in one or more acquired SPS signals exceeds a threshold, etc.), then the mobile device may transmit one or more messages requesting information about LCIs that may be within a vicinity of an initial estimated position of the mobile device. In certain instances, a mobile device may receive applicable navigation assistance data for an LCI that may be adjacent to an outdoor environment comprising the initial estimated position of the mobile device.

In certain other instances a mobile device may receive applicable navigation assistance data for a plurality of LCIs that may be adjacent to outdoor environment comprising the initial estimated position of the mobile device. In certain instances, for example, two or more LCIs may be adjacent to said outdoor environment. In certain implementations, for example, two or more LCIs may overlap in their indoor environment coverage and/or share some common navigation assistance data.

Accordingly, in certain implementations a mobile device may obtain a plurality of electronic maps and/or the like for a plurality LCIs, etc. as such, a mobile device may determine one or more locations of one or more transmitting devices relative to the mobile device, e.g., using at least a portion of two or more electronic maps.

In certain example implementations, the use of a plurality of electronic maps may be useful in further estimating an altitude and/or other like height measurement of the mobile device. For example, if the floors of a multileveled structure are separately associated with corresponding LCIs, then it may be possible for a mobile device to estimate its position relative to the arrangement of the floors (e.g., based on signals obtained from transmitting devices in the LCIs) and the electronic maps obtained for the LCIs. Hence, by making use of a variety of transmitting devices, possibly from differently arranged LCIs, a mobile device and/or other computing device supporting the mobile device may estimate a position of the mobile device in three dimensions.

In certain instances, in addition to making use of wireless signal(s) obtained from transmitting device(s), certain techniques herein may allow a mobile device and/or other computing device supporting the mobile device to estimate a position of the mobile device within an outdoor environment based further, at least in part, on one or more SPS signals obtained by the mobile device.

In certain example implementations, a mobile device may store or otherwise maintain (e.g., in memory) all or part of the navigation assistance data it receives. Thus, for example, a mobile device may have a plurality of electronic maps and/or other useful information that may be of subsequent use.

In certain example implementations, a mobile device may request navigation assistance data in advance. For example, a mobile device may request navigation assistance data for a particular position within an outdoor environment that the mobile device is likely not currently located at or even nearby. As such, a mobile device may identify a particular position which the mobile device may possibly be at or nearby at some future time. By way of example, a mobile device may project its direction of travel to some time in the future to identify a particular position which may then be used to request navigation assistance data. This may be beneficial to avoid delays in receiving navigation assistance data for an outdoor area that the mobile device may be heading towards. In another example, a mobile device may identify a particular position which the mobile device may possibly be at or nearby at some future time based on other information that may be available regarding the mobile device, the user associated with the mobile device, etc. For example, a calendar event stored within or otherwise obtainable by the mobile device may identify a particular medical appointment for a user of a mobile device. Hence, a particular position in an outdoor environment surrounding an applicable medical building (and/or floor/wing thereof), corresponding LCIs, etc., may be used to request and obtain navigation assistance data in advance corresponding to one or more indoor environments adjacent to the outdoor environment. For example, an electronic mail or other like document/file stored within or otherwise obtainable by the mobile device may identify a point of arrival associated with an airline flight, train station, etc., and navigation assistance data for a particular position in outdoor environment at or nearby such a point of arrival may be requested and obtained in advance.

In certain instances, it may be useful for a mobile device to acquire wireless signals from transmitting devices that may be operatively provisioned in different indoor environments (e.g., different LCIs, etc.). Accordingly, as presented in certain example implementations, a mobile device may request and obtain navigation assistance data for a plurality of indoor environments via one or more messages to/from one or more computing devices. For example, a mobile device may, at times, request navigation assistance data corresponding to all or part of two or more LCIs from a single computing device, or possibly from a plurality of computing devices. As such, a mobile device may, at times, receive at least a portion of the navigation assistance data corresponding to two or more LCIs from a single computing device. In other example implementations, a mobile device may, at times, receive at least a portion of the navigation assistance data corresponding to a first LCI from a first computing device, and at least a portion of the navigation assistance data corresponding to a second LCI from a second computing device.

In certain example implementations, apparatus 112 may determine whether a mobile device may be within an outdoor environment. By way of example, in certain instances apparatus 112 may consider an initial estimated position of the mobile device which may place the mobile device at or nearby (e.g., within a threshold distance) an outdoor environment, or possibly at or nearby to one or more indoor environments which may be adjacent to and/or otherwise within a particular distance of all or part of the outdoor environment. In accordance with other example implementations, apparatus 112 may consider other information that may be informative regarding the mobile device's likely position with regard to an outdoor environment. Thus, for example, in certain instances a mobile device may be capable of determining and communicating whether it may be located indoors or outdoors, and/or may have transitioned, may be transitioning, or may be anticipating a transition at some point in time, between an indoor environment and an outdoor environment. By way of example, certain instances a mobile device make such determination based, at least in part, on detected changes in SPS signals or other like wireless signals, detected changes in ambient light, detected changes in ambient temperature, detected changes in sound, information from a navigation like positioning capability (e.g., a trajectory estimation, dead reckoning, etc.), one or more user inputs, and/or the like or some combination thereof. Accordingly, a mobile device may inform apparatus 112 in some manner regarding such a determination and/or provide all or part of such information that may be considered in rendering such decision by apparatus 112.

In response to a determination that a mobile device may be within an outdoor environment, apparatus 112 may in certain instances indicate one or more indoor environments that may be adjacent to or otherwise close by the outdoor environment. By way of example, in certain implementations, apparatus 112 may transmit one or more messages to mobile device to identify one or more LCIs for one or more indoor environments. Accordingly, in certain implementations a mobile device may request navigation assistance data for one or more LCIs, e.g., from one or more computing devices.

As described herein such navigation assistance data may be of use while the mobile device is within the outdoor environment. Additionally, in certain implementations, a mobile device may request indoor navigation assistance data for use within one or more of the LCIs or other like identified indoor environments. Thus, for example, in certain implementations a mobile device may obtain electronic maps, location-based assistance information, radio heatmaps, routability graphs, etc., relating to one or more of the indoor environments.

In accordance with certain aspects, it may be beneficial for all or part of the navigation assistance data to be relatable in some manner to all or part of similar information regarding positioning and/or navigation within the outdoor and/or indoor environments. Thus for example, it may be beneficial for all or part of the navigation assistance data to be aligned or otherwise adapted in some manner to match one or more electronic maps, etc., associated with one or more indoor structures. For example, in certain instances particular map coordinates, directions, and/or other like alignment information may be specified or otherwise determinable for such data/information.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing," "computing," "calculating," "determining", "establishing", "obtaining", "identifying", "applying," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
    obtaining navigation assistance data for a plurality of transmitting devices, wherein at least a first transmitting device of said plurality of transmitting devices is operatively provisioned for use within at least a portion of a first indoor environment and at least a first portion of an outdoor environment that is adjacent to said first indoor environment, said navigation assistance data indicating a prioritization order for a search for wireless signals from said first transmitting device and at least other transmitting device of said plurality of transmitting devices, said prioritization order being based, at least in part, on a relative direction and/or a relative distance regarding an initial estimated position of said mobile device and said first transmitting device;
    storing at least a portion of said navigation assistance data in a memory on board said mobile device; and
    initiating said search for said wireless signals based on said prioritization order.

2. The method as recited in claim 1, and further comprising, at said mobile device:
    with said mobile device in said outdoor environment, acquiring a wireless signal transmitted from said first transmitting device; and
    estimating a position of said mobile device within said outdoor environment based, at least in part, on application of said navigation assistance data to said wireless signal.

3. The method as recited in claim 1, said navigation assistance data being further for at least a second transmitting device operatively provisioned for use within at least a portion of a second indoor environment and at least a second portion of said outdoor environment that is adjacent to said second indoor environment.

4. The method as recited in claim 3, wherein said first portion of said outdoor environment overlaps, at least in part, with said second portion of said outdoor environment.

5. The method as recited in claim 3, wherein said first indoor environment comprises at least a part of said second indoor environment.

6. The method as recited in claim 3, said navigation assistance data further comprising navigation assistance data for another transmitting device that is operatively provisioned for use within said first indoor environment and/or said second indoor environment, but not said outdoor environment.

7. The method as recited in claim 1, wherein obtaining said navigation assistance data further comprises:
transmitting a first message indicative of an initial estimated position of said mobile device within said outdoor environment; and
receiving a second message indicative of said navigation assistance data.

8. The method as recited in claim 1, wherein obtaining said navigation assistance data further comprises:
transmitting a first message indicative of an initial estimated position of said mobile device within said outdoor environment; and
receiving a second message indicative of a first location context identifier (LCI) for at least said portion of said first indoor environment.

9. The method as recited in claim 8, wherein obtaining said navigation assistance data further comprises:
transmitting a third message to request said navigation assistance data, said third message indicating at least said first LCI; and
receiving a fourth message comprising said navigation assistance data.

10. The method as recited in claim 9, wherein said second message and said fourth message are transmitted by different computing devices, and/or said first message and said third message are transmitted to said different computing devices.

11. The method as recited in claim 8, wherein said navigation assistance data indicates an altitude corresponding to at least said first LCI, and further comprising, at said mobile device:
with said mobile device in said outdoor environment, acquiring a wireless signal transmitted from said first transmitting device; and
calculating said initial estimated position based, at least in part, on application of said navigation assistance data to said wireless signal and said altitude.

12. The method as recited in claim 1, wherein said navigation assistance data identifies said first transmitting device and a position of said first transmitting device.

13. The method as recited in claim 1, wherein said navigation assistance data comprises a radio heatmap for said first transmitting device with regard to at least said first portion of said outdoor environment.

14. The method as recited in claim 1, wherein said navigation assistance data does not include navigation assistance data for said first indoor environment.

15. The method as recited in claim 3, wherein obtaining said navigation assistance data further comprises:
transmitting a first message indicative of an initial estimated position of said mobile device within said outdoor environment; and
receiving a second message indicative of at least: a first LCI for at least said portion of said first indoor environment, and a second LCI for at least said portion of said second indoor environment.

16. The method as recited in claim 15, wherein obtaining said navigation assistance data further comprises:
transmitting a third message to request said navigation assistance data, said third message indicating at least: said first LCI and said second LCI; and
receiving a fourth message comprising said navigation assistance data.

17. The method as recited in claim 16, wherein receiving said fourth message comprises:
receiving at least a portion of said navigation assistance data corresponding to said first LCI from a first computing device; and
receiving at least a portion of said navigation assistance data corresponding to said second LCI from a second computing device.

18. An apparatus for use in a mobile device the apparatus comprising:
means for obtaining navigation assistance data for a plurality of transmitting devices, wherein at least a first transmitting device of said plurality of transmitting devices is operatively provisioned for use within at least a portion of a first indoor environment and at least a first portion of an outdoor environment that is adjacent to said first indoor environment, said navigation assistance data indicating a prioritization order for a search for wireless signals from said first transmitting device and at least other transmitting device of said plurality of transmitting devices, said prioritization order being based, at least in part, on a relative direction and/or a relative distance regarding an initial estimated position of said mobile device and said first transmitting device;
means for storing at least a portion of said navigation assistance data; and
means for initiating said search for said wireless signals based on said prioritization order.

19. The apparatus as recited in claim 18, and further comprising:
means for acquiring a wireless signal transmitted from said first transmitting device, with said mobile device in said outdoor environment; and
means for estimating a position of said mobile device within said outdoor environment based, at least in part, on application of said navigation assistance data to said wireless signal.

20. The apparatus as recited in claim 18, said navigation assistance data being further for at least a second transmitting device operatively provisioned for use within at least a portion of a second indoor environment and at least a second portion of said outdoor environment that is adjacent to said second indoor environment.

21. The apparatus as recited in claim 20, wherein said first portion of said outdoor environment overlaps, at least in part, with said second portion of said outdoor environment.

22. The apparatus as recited in claim 20, wherein said first indoor environment comprises at least a part of said second indoor environment.

23. The apparatus as recited in claim 20, said navigation assistance data further comprising navigation assistance data for another transmitting device that is operatively provisioned for use within said first indoor environment and/or said second indoor environment, but not said outdoor environment.

24. The apparatus as recited in claim 18, and further comprising:
  means for transmitting a first message indicative of an initial estimated position of said mobile device within said outdoor environment; and
  means for receiving a second message indicative of said navigation assistance data.

25. The apparatus as recited in claim 18, and further comprising:
  means for transmitting a first message indicative of an initial estimated position of said mobile device within said outdoor environment; and
  means for receiving a second message indicative of a location context identifier (LCI) for at least said portion of said first indoor environment.

26. The apparatus as recited in claim 25, and further comprising:
  means for transmitting a third message to request said navigation assistance data, said third message indicating at least said LCI; and
  means for receiving a fourth message comprising said navigation assistance data.

27. The apparatus as recited in claim 26, wherein said second message and said fourth message are transmitted by different computing devices, and/or said first message and said third message are transmitted to said different computing devices.

28. The apparatus as recited in claim 25, wherein said navigation assistance data indicates an altitude corresponding to at least said LCI, and further comprising:
  means for acquiring a wireless signal transmitted from said first transmitting device, with said mobile device in said outdoor environment; and
  means for calculating said initial estimated position based, at least in part, on application of said navigation assistance data to said wireless signal and said altitude.

29. The apparatus as recited in claim 18, wherein said navigation assistance data identifies said first transmitting device and a position of said first transmitting device.

30. The apparatus as recited in claim 18, wherein said navigation assistance data comprises a radio heatmap for said first transmitting device with regard to at least said first portion of said outdoor environment.

31. The apparatus as recited in claim 18, wherein said navigation assistance data does not include navigation assistance data for said first indoor environment.

32. The apparatus as recited in claim 20, and further comprising:
  means for transmitting a first message indicative of an initial estimated position of said mobile device within said outdoor environment; and
  means for receiving a second message indicative of at least:
    a first LCI for at least said portion of said first indoor environment, and a second LCI for at least said portion of said second indoor environment.

33. The apparatus as recited in claim 32, and further comprising:
  means for transmitting a third message to request said navigation assistance data, said third message indicating at least: said first LCI and said second LCI; and
  means for receiving a fourth message comprising said navigation assistance data.

34. The apparatus as recited in claim 33, wherein said means for receiving said fourth message further comprises:
  means for receiving at least a portion of said navigation assistance data corresponding to said first LCI from a first computing device; and
  means for receiving at least a portion of said navigation assistance data corresponding to said second LCI from a second computing device.

35. A mobile device comprising:
  memory;
  a communication interface;
  a processing unit to:
    obtain, via said communication interface, navigation assistance data for a plurality of transmitting devices, wherein at least a first transmitting device of said plurality of transmitting devices is operatively provisioned for use within at least a portion of a first indoor environment and at least a first portion of an outdoor environment that is adjacent to said first indoor environment, said navigation assistance data indicating a prioritization order for a search for wireless signals from said first transmitting device and at least other transmitting device of said plurality of transmitting devices, said prioritization order being based, at least in part, on a relative direction and/or a relative distance regarding an initial estimated position of said mobile device and said first transmitting device;
    initiate storage of at least a portion of said navigation assistance data in said memory; and
    initiate said search for said wireless signals based on said prioritization order via said communication interface.

36. The mobile device as recited in claim 35, said processing unit to further:
  with said mobile device in said outdoor environment, acquire, via said communication interface, a wireless signal transmitted from said first transmitting device; and
  estimate a position of said mobile device within said outdoor environment based, at least in part, on application of said navigation assistance data to said wireless signal.

37. The mobile device as recited in claim 35, said navigation assistance data being further for at least a second transmitting device operatively provisioned for use within at least a portion of a second indoor environment and at least a second portion of said outdoor environment that is adjacent to said second indoor environment.

38. The mobile device as recited in claim 37, wherein said first portion of said outdoor environment overlaps, at least in part, with said second portion of said outdoor environment.

39. The mobile device as recited in claim 37, wherein said first indoor environment comprises at least a part of said second indoor environment.

40. The mobile device as recited in claim 37, said navigation assistance data further comprising navigation assistance data for another transmitting device that is operatively provisioned for use within said first indoor environment and/or said second indoor environment, but not said outdoor environment.

41. The mobile device as recited in claim 36, said processing unit to further:
  initiate transmission of a first message via said communication interface, said first message being indicative of an initial estimated position of said mobile device within said outdoor environment; and
  receiving a second message via said communication interface, said second message indicative of said navigation assistance data.

42. The mobile device as recited in claim 35, said processing unit to further:
  initiate transmission of a first message via said communication interface, said first message being indicative of an initial estimated position of said mobile device within said outdoor environment; and receiving a second message via said communication interface, said second message indicative of a location context identifier (LCI) for at least said portion of said first indoor environment.

43. The mobile device as recited in claim 42, said processing unit to further:

initiate transmission of a third message via said communication interface said third message to request said navigation assistance data, said third message indicating at least said LCI; and receiving a fourth message via said communication interface, said fourth message comprising said navigation assistance data.

44. The mobile device as recited in claim 43, wherein said second message and said fourth message are transmitted by different computing devices, and/or said first message and said third message are transmitted to said different computing devices.

45. The mobile device as recited in claim 42, wherein said navigation assistance data indicates an altitude corresponding to at least said LCI, and said processing unit to further:

with said mobile device in said outdoor environment, acquire, via said communication interface, a wireless signal transmitted from said first transmitting device; and calculate said initial estimated position based, at least in part, on application of said navigation assistance data to said wireless signal and said altitude.

46. The mobile device as recited in claim 36, wherein said navigation assistance data identifies said first transmitting device and a position of said first transmitting device.

47. The mobile device as recited in claim 36, wherein said navigation assistance data comprises a radio heatmap for said first transmitting device with regard to at least said first portion of said outdoor environment.

48. The mobile device as recited in claim 36, wherein said navigation assistance data does not include navigation assistance data for said first indoor environment.

49. The mobile device as recited in claim 37, said processing unit to further:

initiate transmission of a first message via said communication interface, said first message being indicative of an initial estimated position of said mobile device within said outdoor environment; and receive a second message via said communication interface, said second message being indicative of at least: a first LCI for at least said portion of said first indoor environment, and a second LCI for at least said portion of said second indoor environment.

50. The mobile device as recited in claim 49, said processing unit to further:

initiate transmission, via said communication interface, of a third message to request said navigation assistance data, said third message indicating at least: said first LCI and said second LCI.

51. The mobile device as recited in claim 49, said processing unit to further:

receive, via said communication interface, a fourth message comprising said navigation assistance data.

52. The mobile device as recited in claim 49, said processing unit to further, via said communication interface:

receive at least a portion of said navigation assistance data corresponding to said first LCI from a first computing device; and receive at least a portion of said navigation assistance data corresponding to said second LCI from a second computing device.

53. A non-transitory article comprising:

a non-transitory computer readable medium having stored therein computer implementable instructions that are executable by a processing unit of a mobile device to:

obtain one or more signals representing navigation assistance data for a plurality of transmitting devices, wherein at least a first transmitting device of said plurality of transmitting devices is operatively provisioned for use within at least a portion of a first indoor environment and at least a first portion of an outdoor environment that is adjacent to said first indoor environment, said navigation assistance data indicating a prioritization order for a search for wireless signals from said first transmitting device and at least other transmitting device of said plurality of transmitting devices, said prioritization order being based, at least in part, on a relative direction and/or a relative distance regarding an initial estimated position of said mobile device and said first transmitting device;

initiate storage of at least a portion of said navigation assistance data at said mobile device; and initiate said search for said wireless signals based on said prioritization order.

54. The non-transitory article as recited in claim 53, said computer implementable instructions being further executable by said processing unit to:

acquire a wireless signal transmitted from said first transmitting device, with said mobile device in said outdoor environment; and estimate a position of said mobile device within said outdoor environment based, at least in part, on application of said navigation assistance data to said wireless signal.

55. The non-transitory article as recited in claim 53, said navigation assistance data being further for at least a second transmitting device operatively provisioned for use within at least a portion of a second indoor environment and at least a second portion of said outdoor environment that is adjacent to said second indoor environment.

56. The non-transitory article as recited in claim 55, wherein said first portion of said outdoor environment overlaps, at least in part, with said second portion of said outdoor environment.

57. The non-transitory article as recited in claim 55, wherein said first indoor environment comprises at least a part of said second indoor environment.

58. The non-transitory article as recited in claim 55, said navigation assistance data further comprising navigation assistance data for another transmitting device that is operatively provisioned for use within said first indoor environment and/or said second indoor environment, but not said outdoor environment.

59. The non-transitory article as recited in claim 53, said computer implementable instructions being further executable by said processing unit to:

initiate transmission of a first message indicative of an initial estimated position of said mobile device within said outdoor environment; and receive a second message indicative of said navigation assistance data.

60. The non-transitory article as recited in claim 53, said computer implementable instructions being further executable by said processing unit to:

initiate transmission of a first message indicative of an initial estimated position of said mobile device within said outdoor environment; and receive a second message indicative of a location context identifier (LCI) for at least said portion of said first indoor environment.

61. The non-transitory article as recited in claim 60, said computer implementable instructions being further executable by said processing unit to:

initiate transmission of a third message to request said navigation assistance data, said third message indicating at least said LCI; and receive a fourth message comprising said navigation assistance data.

62. The non-transitory article as recited in claim 61, wherein said second message and said fourth message are transmitted by different computing devices, and/or said first message and said third message are transmitted to said different computing devices.

63. The non-transitory article as recited in claim 60, wherein said navigation assistance data indicates an altitude corresponding to at least said LCI, and said computer implementable instructions being further executable by said processing unit to:

acquire a wireless signal transmitted from said first transmitting device, with said mobile device in said outdoor environment; and calculate said initial estimated position based, at least in part, on application of said navigation assistance data to said wireless signal and said altitude.

64. The non-transitory article as recited in claim 53, wherein said navigation assistance data identifies said first transmitting device and a position of said first transmitting device.

65. The non-transitory article as recited in claim 53, wherein said navigation assistance data comprises a radio heatmap for said first transmitting device with regard to at least said first portion of said outdoor environment.

66. The non-transitory article as recited in claim 53, wherein said navigation assistance data does not include navigation assistance data for said first indoor environment.

67. The non-transitory article as recited in claim 55, said computer implementable instructions being further executable by said processing unit to:

initiate transmission of a first message indicative of an initial estimated position of said mobile device within said outdoor environment; and receive a second message indicative of at least: a first LCI for at least said portion of said first indoor environment, and a second LCI for at least said portion of said second indoor environment.

68. The non-transitory article as recited in claim 67, said computer implementable instructions being further executable by said processing unit to:

initiate transmission of a third message to request said navigation assistance data, said third message indicating at least: said first LCI and said second LCI.

69. The non-transitory article as recited in claim 67, said computer implementable instructions being further executable by said processing unit to:

receive a fourth message comprising said navigation assistance data.

70. The non-transitory article as recited in claim 67, said computer implementable instructions being further executable by said processing unit to:

receive at least a portion of said navigation assistance data corresponding to said first LCI from a first computing device; and receive at least a portion of said navigation assistance data corresponding to said second LCI from a second computing device.

71. A method comprising, at a computing device:

receiving a request for navigation assistance data from a mobile device, said request for navigation assistance data being indicative of an initial estimated position of said mobile device within an outdoor environment; and transmitting a response to said mobile device, said response comprising navigation assistance data for a plurality of transmitting devices, wherein at least a first transmitting device of said plurality of transmitting devices is operatively provisioned for use within at least a first portion of said outdoor environment and at least said portion of said first indoor environment, said navigation assistance data indicating a prioritization order for a search for wireless signals from said first transmitting device and at least other transmitting device of said plurality of transmitting devices, said prioritization order being based, at least in part, on a relative direction and/or a relative distance regarding said initial estimated position of said mobile device and said first transmitting device.

72. The method as recited in claim 71, said navigation assistance data being further for at least a second transmitting device operatively provisioned for use within at least a portion of a second indoor environment and at least a second portion of said outdoor environment that is adjacent to said second indoor environment.

73. The method as recited in claim 72, wherein said first portion of said outdoor environment overlaps, at least in part, with said second portion of said outdoor environment.

74. The method as recited in claim 72, wherein said first indoor environment comprises at least a part of said second indoor environment.

75. The method as recited in claim 72, said navigation assistance data further comprising navigation assistance data for another transmitting device that is operatively provisioned for use within said first indoor environment and/or said second indoor environment, but not said outdoor environment.

76. The method as recited in claim 71, wherein said navigation assistance data identifies said first transmitting device and a position of said first transmitting device.

77. The method as recited in claim 76, wherein said position of said first transmitting device further indicates an altitude of said first transmitting device.

78. The method as recited in claim 71, wherein said navigation assistance data comprises a radio heatmap for said first transmitting device with regard to at least said first portion of said outdoor environment.

79. The method as recited in claim 71, wherein said navigation assistance data does not include navigation assistance data for said first indoor environment.

80. An apparatus comprising:

means for receiving a request for navigation assistance data from a mobile device, said request for navigation assistance data being indicative of an initial estimated position of said mobile device within an outdoor environment; and means for transmitting a response to said mobile device, said response comprising navigation assistance data for a plurality of transmitting devices, wherein at least a first transmitting device of said plurality of transmitting devices is operatively provisioned for use within at least a first portion of said outdoor environment and at least said portion of said first indoor environment, said navigation assistance data indicating a prioritization order for a search for wireless signals from said first transmitting device and at least other transmitting device of said plurality of transmitting devices, said prioritization order being based, at least in part, on a relative direction and/or a relative distance regarding said initial estimated position of said mobile device and said first transmitting device.

81. The apparatus as recited in claim 80, said navigation assistance data being further for at least a second transmitting device operatively provisioned for use within at least a portion of a second indoor environment and at least a second portion of said outdoor environment that is adjacent to said second indoor environment.

82. The apparatus as recited in claim 81, wherein said first portion of said outdoor environment overlaps, at least in part, with said second portion of said outdoor environment.

83. The apparatus as recited in claim 81, wherein said first indoor environment comprises at least a part of said second indoor environment.

84. The apparatus as recited in claim 81, said navigation assistance data further comprising navigation assistance data for another transmitting device that is operatively provisioned for use within said first indoor environment and/or said second indoor environment, but not said outdoor environment.

85. The apparatus as recited in claim 80, wherein said navigation assistance data identifies said first transmitting device and a position of said first transmitting device.

86. The apparatus as recited in claim 85, wherein said position of said first transmitting device further indicates an altitude of said first transmitting device.

87. The apparatus as recited in claim 80, wherein said navigation assistance data comprises a radio heatmap for said first transmitting device with regard to at least said first portion of said outdoor environment.

88. The apparatus as recited in claim 80, wherein said navigation assistance data does not include navigation assistance data for said first indoor environment.

89. A computing device:
a communication interface; and
a processing unit to:
obtain a request for navigation assistance data from a mobile device via said communication interface, said request for navigation assistance data being indicative of an initial estimated position of said mobile device within an outdoor environment; and
initiate transmission of a response to said mobile device via said communication interface, said response comprising navigation assistance data for a plurality of transmitting devices, wherein at least a first transmitting device of said plurality of transmitting devices is operatively provisioned for use within at least a first portion of said outdoor environment and at least said portion of said first indoor environment, said navigation assistance data indicating a prioritization order for a search for wireless signals from said first transmitting device and at least other transmitting device of said plurality of transmitting devices, said prioritization order being based, at least in part, on a relative direction and/or a relative distance regarding said initial estimated position of said mobile device and said first transmitting device.

90. The computing device as recited in claim 89, said navigation assistance data being further for at least a second transmitting device operatively provisioned for use within at least a portion of a second indoor environment and at least a second portion of said outdoor environment that is adjacent to said second indoor environment.

91. The computing device as recited in claim 90, wherein said first portion of said outdoor environment overlaps, at least in part, with said second portion of said outdoor environment.

92. The computing device as recited in claim 90, wherein said first indoor environment comprises at least a part of said second indoor environment.

93. The computing device as recited in claim 90, said navigation assistance data further comprising navigation assistance data for another transmitting device that is operatively provisioned for use within said first indoor environment and/or said second indoor environment, but not said outdoor environment.

94. The computing device as recited in claim 89, wherein said navigation assistance data identifies said first transmitting device and a position of said first transmitting device.

95. The computing device as recited in claim 94, wherein said position of said first transmitting device further indicates an altitude of said first transmitting device.

96. The computing device as recited in claim 89, wherein said navigation assistance data comprises a radio heatmap for said first transmitting device with regard to at least said first portion of said outdoor environment.

97. The computing device as recited in claim 89, wherein said navigation assistance data does not include navigation assistance data for said first indoor environment.

98. A non-transitory article comprising:
a non-transitory computer readable medium having stored therein computer implementable instructions that are executable by a processing unit of a computing device to:
obtain one or more signals representing a request for navigation assistance data from a mobile device, said request for navigation assistance data being indicative of an initial estimated position of said mobile device within an outdoor environment; and
initiate transmission of one or more signals representing a response to said mobile device, said response comprising navigation assistance data for a plurality of transmitting devices, wherein at least a first transmitting device of said plurality of transmitting devices is operatively provisioned for use within at least a first portion of said outdoor environment and at least said portion of said first indoor environment, said navigation assistance data indicating a prioritization order for a search for wireless signals from said first transmitting device and at least other transmitting device of said plurality of transmitting devices, said prioritization order being based, at least in part, on a relative direction and/or a relative distance regarding said initial estimated position of said mobile device and said first transmitting device.

99. The non-transitory article as recited in claim 98, said navigation assistance data being further for at least a second transmitting device operatively provisioned for use within at least a portion of a second indoor environment and at least a second portion of said outdoor environment that is adjacent to said second indoor environment.

100. The non-transitory article as recited in claim 99, wherein said first portion of said outdoor environment overlaps, at least in part, with said second portion of said outdoor environment.

101. The non-transitory article as recited in claim 99, wherein said first indoor environment comprises at least a part of said second indoor environment.

102. The non-transitory article as recited in claim 99, said navigation assistance data further comprising navigation assistance data for another transmitting device that is operatively provisioned for use within said first indoor environment and/or said second indoor environment, but not said outdoor environment.

103. The non-transitory article as recited in claim 98, wherein said navigation assistance data identifies said first transmitting device and a position of said first transmitting device.

104. The non-transitory article as recited in claim 103, wherein said position of said first transmitting device further indicates an altitude of said first transmitting device.

105. The non-transitory article as recited in claim 98, wherein said navigation assistance data comprises a radio heatmap for said first transmitting device with regard to at least said first portion of said outdoor environment.

106. The non-transitory article as recited in claim 98, wherein said navigation assistance data does not include navigation assistance data for said first indoor environment.

* * * * *